(12) United States Patent
Molloy et al.

(10) Patent No.: US 11,783,025 B2
(45) Date of Patent: Oct. 10, 2023

(54) TRAINING DIVERSE AND ROBUST ENSEMBLES OF ARTIFICIAL INTELLIGENCE COMPUTER MODELS

(71) Applicant: International Business Machines Corporation, Armonk, NY (US)

(72) Inventors: Ian Michael Molloy, Chappaqua, NY (US); Taesung Lee, Ridgefield, CT (US); Benjamin James Edwards, St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 16/816,625

(22) Filed: Mar. 12, 2020

(65) Prior Publication Data

US 2021/0287141 A1 Sep. 16, 2021

(51) Int. Cl.
| | |
|---|---|
| G06F 21/52 | (2013.01) |
| G06N 20/20 | (2019.01) |
| G06F 21/60 | (2013.01) |
| G06F 18/22 | (2023.01) |
| G06F 18/25 | (2023.01) |
| G06V 10/74 | (2022.01) |
| G06V 10/776 | (2022.01) |
| G06V 10/80 | (2022.01) |
| G06V 10/82 | (2022.01) |
| G06V 10/98 | (2022.01) |

(52) U.S. Cl.
CPC .............. *G06F 21/52* (2013.01); *G06F 18/22* (2023.01); *G06F 18/251* (2023.01); *G06F 21/60* (2013.01); *G06N 20/20* (2019.01); *G06V 10/761* (2022.01); *G06V 10/776* (2022.01); *G06V 10/809* (2022.01); *G06V 10/82* (2022.01); *G06V 10/98* (2022.01)

(58) Field of Classification Search
CPC .... G06N 20/20; G06V 10/7515; G06F 21/60; G06K 9/6215; G06K 9/6289
USPC ........................................................ 706/12
See application file for complete search history.

(56) References Cited

U.S. PATENT DOCUMENTS

| | | |
|---|---|---|
| 2011/0125734 A1 | 5/2011 | Duboue et al. |
| 2018/0018590 A1 | 1/2018 | Szeto et al. |
| 2018/0293463 A1 | 10/2018 | Brown |

(Continued)

OTHER PUBLICATIONS

Adam, George et al., "Reducing Adversarial Example Transferability Using Gradient Regularization", arXiv: 1904.07980v1 [cs.LG], Apr. 16, 2019, 13 pages.

(Continued)

*Primary Examiner* — Tsu-Chang Lee
(74) *Attorney, Agent, or Firm* — Stephen J. Walder, Jr.; Anthony M. Pallone

(57) ABSTRACT

Mechanisms are provided to implement a hardened ensemble artificial intelligence (AI) model generator. The hardened ensemble AI model generator co-trains at least two AI models. The hardened ensemble AI model generator modifies, based on a comparison of the at least two AI models, a loss surface of one or more of the at least two AI models to prevent an adversarial attack on one AI model, in the at least two AI models, transferring to another AI model in the at least two AI models, to thereby generate one or more modified AI models. At least one of the one or more modified AI models then processes an input to generate an output result.

20 Claims, 6 Drawing Sheets

(56) References Cited

U.S. PATENT DOCUMENTS

| | | | |
|---|---|---|---|
| 2019/0228336 A1 | 7/2019 | Kanagawa et al. | |
| 2020/0220892 A1* | 7/2020 | Gibson | G06F 16/9024 |
| 2020/0222010 A1* | 7/2020 | Howard | A61N 1/36139 |
| 2020/0356810 A1* | 11/2020 | Zhong | G06V 10/776 |

OTHER PUBLICATIONS

Demontis, Ambra et al., "Why Do Adversarial Attacks Transfer? Explaining Transferability of Evasion and Poisoning Attacks", Proceedings of the 28th USENIX Security Symposium, Aug. 14-16, 2019, 19 pages.

Goodfellow, Ian J. et al., "Explaining and Harnessing Adversarial Examples", 3rd International Conference on Learning Representations (ICLR2015), arXiv: 1412.6572v3 [stat.ML], Mar. 20, 2015, pp. 1-11.

High, Rob, "The Era of Cognitive Systems: An Inside Look at IBM Watson and How it Works", IBM Corporation, Redbooks, Dec. 12, 2012, 16 pages.

Pang, Tianyu et al., "Improving Adversarial Robustness via Promoting Ensemble Diversity", Proceedings of the 36th International Conference on Machine Learning, arXiv: 1901.08846v3 [cs.LG] May 29, 2019, 13 pages.

Yuan, Michael J., "Watson and Healthcare, How natural language processing and semantic search could revolutionize clinical decision support", IBM Corporation, developerWorks, http://www.ibm.com/developerworks/industry/library/ind-watson/, Apr. 12, 2011, 14 pages.

\* cited by examiner

TRAINING DIVERSE AND ROBUST ENSEMBLES OF ARTIFICIAL INTELLIGENCE COMPUTER MODELS

BACKGROUND

The present application relates generally to an improved data processing apparatus and method and more specifically to mechanisms for training divers and robust ensembles of artificial intelligence computer models.

Deep learning is part of a broader family of machine learning methods based on learning data representations as opposed to task-specific algorithms. Some representations are loosely based on interpretation of information processing and communication patterns in a biological nervous system, such as neural coding that attempts to define a relationship between various stimuli and associated neuronal responses in the brain. Research attempts to create efficient systems to learn these representations from large-scale, unlabeled data sets.

Deep learning architectures such as deep neural networks, deep belief networks, and recurrent neural networks, have been applied to fields including computer vision, speech recognition, natural language processing, audio recognition, social network filtering, machine translation, and bioinformatics where they produced results comparable to, and in some cases superior to, human experts.

Neural network based deep learning is a class of machine learning algorithms that use a cascade of many layers of nonlinear processing units for feature extraction and transformation. Each successive layer uses the output from the previous layer as input. The algorithms may be supervised or unsupervised and applications include pattern analysis (unsupervised) and classification (supervised). Neural network based deep learning is based on the learning of multiple levels of features or representations of the data with higher level features being derived from lower level features to form a hierarchical representation. The composition of a layer of nonlinear processing units of the neural network used in a deep learning algorithm depends on the problem to be solved. Layers that have been used in deep learning include hidden layers of an artificial neural network and sets of complicated propositional formulas. They may also include latent variables organized layer-wise in deep generative models such as the nodes in deep belief networks and deep Boltzmann machines.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions which are executed by the processor to specifically configure the processor to implement a hardened ensemble artificial intelligence (AI) model generator. The method comprises co-training, by the hardened ensemble AI model generator, at least two AI models. The method further comprises modifying, by the hardened ensemble AI model generator, based on a comparison of the at least two AI models, a loss surface of one or more of the at least two AI models to prevent an adversarial attack on one of the AI models, in the at least two AI models, transferring to another AI model in the at least two AI models, to thereby generate one or more modified AI models. Moreover, the method comprises processing, by at least one of the one or more modified AI models, an input to generate an output result.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1A:
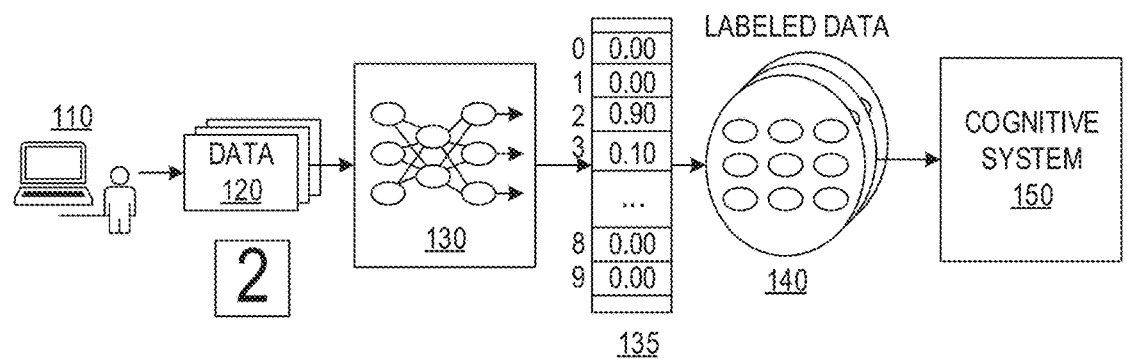
FIGS. 1A and 1B are block diagrams illustrating the adversarial input problem addressed by the present invention.

Various cognitive systems may utilize trained artificial intelligence computer models, such as trained neural networks, deep learning models, and various other types of machine learning based models, to perform their cognitive operations. For example, a neural network implemented model may be used to provide image analysis, facial recognition, fingerprint or retinal image recognition, speech pattern analysis, or the like, for a cognitive security system, such as an image recognition surveillance system, a biometric authentication system, etc. Often times, such neural networks, and other types of machine learning or cognitive models, are utilized in or with cognitive systems to perform a classification operation upon which the cognitive system operates to perform a cognitive operation, e.g., classifying an input into one of a plurality of predetermined classifications (classes) which is then used to perform a more complex analysis or reasoning operation using cognitive system mechanisms.

Attackers may attempt to thwart such systems by performing evasion attacks, such as gradient-based attacks. An evasion attack on a cognitive system, e.g., on the neural network or other cognitive or machine learning model implemented by the cognitive system, involves the attacker attempting to fool the model to misclassify a manipulated input. For example, an attacker may make almost imperceptible manipulations on input data to generate adversarial input, where an adversarial input is an input formed by applying small, but intentional, perturbations to data samples from a data set (where the term "data set" as used herein refers to a set of one or more data samples), such that the perturbed input results in the model, e.g., neural network, outputting an incorrect answer with high confidence. The adversarial input will cause the neural network to misclassify the input and thus, malfunction, resulting in a breach of security. Such misclassification may prevent the system from correctly classifying valid inputs as valid, or allow invalid inputs to be incorrectly classified as valid. For example, an attacker attempting to fool a facial recognition neural network may purposefully add small imperfections to their appearance, and thereby generate an adversarial input, in an attempt to fool the facial recognition into misclassifying the attacker as an authorized individual.

Such evasion attacks, e.g., FGSM and the like, tend to be classifiable as white box attacks and are dependent upon the attacker identifying a correct gradient of the loss surface of the neural network or other cognitive or machine learning model. The loss surface, also referred to as the loss function or cost function, in the context of machine learning, neural networks, and cognitive system operations, is a function that represents the price paid for inaccuracy of predictions, e.g., the cost of inaccuracy in a classification prediction. A white box attack involves the attacker having full access to the machine learning model and its weights, as opposed to black box attacks where the attacker can only control the input and can see the output of the model, or a gray box attack in which the attacker knows some of the model weights or meta information, such as the optimizer used for training, the model architecture, and the training data used. Such white box attacks are mostly based on gradients, as described in Goodfellow et al., "Explaining and Harnessing Adversarial Examples," ICLR 2015, Mar. 20, 2015. For example, the JSMA attack is a type of white box attack that greedily modifies one pixel at a time until the image is classified incorrectly. The FGSM attack takes a single step, for all pixels, in the direction of the gradient. The Carlini and Wagner attack uses gradient descent to optimize a custom loss function.

While many defensive methods have been proposed for addressing the vulnerabilities of artificial intelligence computer models, such as adversarial training and input preprocessing methods, none of these proposed methods result in robust artificial intelligence models for high dimensional inputs (e.g., over one hundred dimensions). That is, if the input dimension is high, it is likely that there is a dimension that the attacker can manipulate slightly to fool the artificial intelligence computer model. For example, if at least two training samples are needed to define a simple decision boundary correctly for a one dimensional input, $2^N$ training samples are needed for an N dimensional input. This provides significant area where adversarial perturbations may be introduced into an input sample to attack a trained model. Moreover, these defenses focus on a single artificial intelligence computer model and attempt to harden that particular artificial intelligence computer model against attacks. Thus, the applicability of the defense is limited to the particular artificial intelligence computer model to which it is applied.

Furthermore, it has been discovered that many attacks on one artificial intelligence computer model will transfer to another artificial intelligence computer model. That is, the transferability of an attack represents the ability of the attack against an artificial intelligence computer model to be effective against a different, potentially unknown, computer model. The concept of transferability of attacks from one artificial intelligence or machine learning computer model to another is described in Demontis et al., "Why Do Adversarial Attacks Transfer? Explaining Transferability of Evasion and Poisoning Attacks," Proceedings of the 28 USENIX Security Symposium, Aug. 14-16 2019. Thus, even with defense methodologies directed to particular artificial intelligence computer models, these defenses cannot address the transferability of the attack to another artificial intelligence computer model.

The mechanisms of the illustrative embodiments, rather than focusing on a single artificial intelligence computer model, provides a defensive mechanism that operates based on ensembles of artificial intelligence computer models trained on a same domain. Given that adversarial samples transfer between different artificial intelligence computer models, or machine learning computer models, including different architectures, the solution of the illustrative embodiments is to prevent these adversarial samples from transferring between the artificial intelligence/machine learning computer models (hereafter simply referred to as "AI models" or "models"). The term adversarial sample, also referred to as an adversarial example, refers to inputs to AI models that an attacker has intentionally designed to cause the model to make a mistake. To ensure that adversarial samples are prevented from transferring, as described hereafter, the mechanisms of the illustrative embodiments implement an ensemble of two or more models which are trained such that the errors (regions exploited to create adversarial samples) are different while maximizing the benign accuracy.

The mechanisms of the illustrative embodiments add a regularizing term, referred to as a "regularizer," that modifies the decision boundaries/loss surface of an AI model such that attacks on one AI model will not be able to be transferred to the other AI models. The regularizer is a function that is added to the base loss function to create a new loss function. The regularizer term itself may already be present in the loss function, but the value of the regularizer term, i.e. the "regularizer strength," may be initially set to a default value that minimizes the influence of the regularizer term on the loss function, and thus, the decision boundary/loss surface, e.g., the regularizer strength may be zero or any other desired initial value. Thereafter, when the regularizer is "added" to the loss function, this may include, in one illustrative embodiment, actually automatically modifying, by the mechanisms of the illustrative embodiments, the decision boundary/loss surface function to include a new term, i.e. the regularizer term having a regularizer strength, which causes the decision boundary/loss surface functions of the AI models to diverge. In other illustrative embodiments, the "adding" of the regularizer may comprise automatically modifying, by the mechanisms of the illustrative embodiments, the regularizer strength value of the existing regularizer in the loss function, to thereby change the loss function and diverge the loss surfaces of two or more AI models such that an attack on one AI model is not transferrable to the other AI model(s). In some illustrative embodiments, "adding" the regularizer to the loss function may involve a combination of adding a new term to the loss function, i.e. the regularizer, if it does not already exist in the loss function and thereafter increasing/decreasing the regularizer's strength based on evaluation of the similarities of the gradients of the loss surfaces of the AI models.

In this way, the ensemble of AI models is not susceptible to transferability of attacks from one AI model to the other in the same ensemble. As a result, one or more of the AI models in the ensemble will not be a victim of the attack and will provide an accurate output when processing the input. Thus, through ensemble processing, the correct classification or output based on the input will still be able to be achieved even in the case of an adversarial sample input.

As mentioned above, there are two main types of adversarial attacks against AI models, which are categorized based on the level of access the adversary has to the AI models. These are black box attacks, where the adversary can query the AI model with a specific input and obtain the AI model output, and white box attacks, where the adversary has full knowledge of the AI model, including architecture and weights. Many white box attacks, such as FGSM, PGD, and C&W as discussed previously, compute the gradient of the loss with respect to the input and take a step in the direction of the gradient. Black box attacks often involve transfer attacks, which the mechanisms of the illustrative embodiments block by diversifying the AI models and making them different from the one used by the attacker to generate the adversarial inputs. With white box attacks, the attacker relies on gradients, which the mechanisms of the illustrative embodiments block by making the gradients of the AI models discordant, thereby misleading the attacker and allowing at least some of the AI models to predict correctly. While this is by no means an exhaustive list of attack methods, it is representative to illustrate the basis for the mechanisms of the illustrative embodiments, which should be appreciated to be applicable, and a useful defense to any AI model attacks.

With the mechanisms of the illustrative embodiments, two or more AI models are trained such that an adversarial sample against one AI model will not transfer to a second AI model in the two or more AI models. This is accomplished by co-training the AI models and adding, into the loss function, a regularizing term, referred to as the "regularizer," that penalizes against transferrable attacks. With the mechanisms of the illustrative embodiments, the regularizer adds a measure of the degree of gradient agreement among models as an additional factor into the loss so as to prevent the models sharing similar gradients such that an attack may be transferrable.

Specifically, in one illustrative embodiment in which minibatch gradient descent is used to optimize the AI model, for each minibatch of input data, the gradient of the loss (also referred to herein simply as the "gradient") is computed with respect to the input, and a regularizer is added to the loss function if the gradients between two or more AI models are too similar. The optimization algorithm often used for finding weights or coefficients of AI or machine learning models, such as artificial neural networks and logistic regression models, is gradient descent. Gradient descent works by having the AI model make predictions on training data and the error (i.e., loss) on the predictions is then used to update the model in such a way as to reduce the error. In this way, the coefficients or weights of the AI model that result in a minimum error of the AI model on the training dataset are determined by making changes to the AI model that move it along a gradient or slope of errors down toward a minimum error value. Stochastic gradient descent (SGD) is a variation of gradient descent which determines the error and updates the AI model for each example in the training dataset. Batch gradient descent is another variation of gradience descent that determines the error for each example in the training dataset, but only updates the AI model after all training examples have been evaluated. Mini-batch gradient descent is another variation of gradient descent that splits the training dataset into small batches that are used to determine the AI model error and update the AI model coefficients or weights. Mini-batch gradient descent seeks to obtain the benefits of both stochastic gradient descent and batch gradient descent. While a minibatch gradient descent is used as an example, the illustrative embodiments are not limited to such an any size dataset may be used with any desirable AI model optimizing methodologies without departing from the spirit and scope of the present invention.

Thus, in one illustrative embodiment, in which mini-batch gradient descent is used to train the AI model, a regularizer is added to penalize the similar gradients between two or more AI models at each mini-batch. The regularizer is an additional term in the loss function that controls the behavior of the trained AI model with regard to similarity of gradients with other trained AI models. In other illustrative embodiments, this regularizer may be added after processing each batch of training examples (batch gradient descent), or with each example in the training dataset (stochastic gradient descent). In some illustrative embodiments, the regularizer may be added to the loss function based on a cosine similarity of gradients of two or more AI models in an ensemble. For example, for a cosine similarity of gradients of two AI models in an ensemble, given a loss function $L(x,y; M\_k)$ for AI model k and training data $(x, y)$, the new loss function with the regularization is $\tilde{L}(x,y; M\_k) = L(x,y; M\_k) + \lambda \cos(\nabla L(x,y; M\_1), \nabla L(x,y; M\_2))$ where $\lambda$ is regularization parameter having a value referred to as the regularization strength which can be empirically tuned (e.g., largest value with high accuracy). It can be appreciated that this can be generalized to more than two AI models by summing the cosine similarities of every pair of models in the ensemble, for example.

The regularizer, which is added to quantify if the gradients between two or more AI models are too similar, may be any suitable distance measure, such as a cosine similarity, a Lp norm, or the like, such that a distance of the gradients is maximized during the training process. The distance is maximized while minimizing the accuracy loss of the AI models, such as the cross entropy loss. In some embodiments, the distance measure may be converted into a dissimilarity measure such that the sum of the losses may be minimized. In some illustrative embodiments, more than a single gradient step can be taken when computing the loss. In other words, instead of the gradients at the given points in the training data, the perturbations computed with evasion attacks, including iterative approaches (e.g., Carlini-Wagner attack), may be used. That is, the perturbations the attacker uses can be diversified and made discordant among the ensemble AI models so that the attacker cannot transfer attack or find the perturbation that can deceive all AI models in the ensemble at once. With this approach, not just the gradients that are frequently used for evasion attack, but also other perturbations that are usually constructed by iteratively computing gradients, are considered in the defensive mechanisms of the illustrative embodiments.

As touched upon above, in some illustrative embodiments, the application of the regularizer involves computing the gradient with regard to a first AI model in a pairing of AI models and then computing the gradient with regard to a second AI model in the pairing of AI models. Gradients represent the steepest direction to get to a given class or, inversely, go away from a given class. Since one goal of the mechanisms of the illustrative embodiments is to diversify the landscape of the AI model loss surface, any class can be used as long as it is consistent between the AI models being compared. The class may be selected, for example, as a true class in the training data, e.g., ground truth class, or may be randomly selected class in the predetermined set of recognized classes of the AI models.

The gradient for the selected class is computed based on a processing of one or more portions of an input training dataset by the AI model, where the portion is dependent upon the training algorithm utilized, e.g., stochastic gradient descent, batch gradient descent, mini-batch gradient descent, etc. For example, multiple gradient steps may be taken for training the two AI models, and the resulting gradient may be calculated. Calculation of the gradients in the training of AI models is generally known and thus, a more detailed explanation is not provided herein.

The two gradients are then compared and a similarity between the two gradients is calculated. In another embodiment, if the similarity measure between the two gradients is equal to or greater than a predetermined threshold value, then the two gradients are considered to be similar and a regularizer is applied to one or both of the loss functions. For example, the base loss function may be represented as L(x, y), where x is the input data and y is the output data. The regularizing term or function R for an AI model M may be represented as the regularizing function R(M), and may be a function of the similarity of the two gradients. The regularizer is a combination of the regularizing function R(M) and the regularization parameter $\lambda$. Thus, a modified loss function that has the added regularizer may be represented as L(x,y)+$\lambda$R(M), where $\lambda$ is the regularization parameter. In one embodiment, the regularization parameter is a constant set by an expert to balance the performance and the robustness of the AI models, and the regularizer R(M), measuring the similarity or distance of gradients, is used to quantify the needs of regularization in each training step. This may be evaluated every time the loss function is computed to update the model. In this case, the regularization strength is determined dynamically, at each training step based on the similarity of gradients of the given models. While some regularizer techniques may use regularizers to address overfitting problems with models overfitting to the training data, the regularizer mechanisms of the illustrative embodiments do not address overfitting and instead use the similarity of gradients and the regularizer to diversify the models.

What is meant by the regularizer being applied is that the regularizer strength, i.e. the value of the regularization parameter $\lambda$ in the loss function and/or the regularization function R(M), is increased so that it has greater impact during training of the AI model and thereby diversifies the gradient of the AI model relative to the other AI model with which the gradient is compared. The regularization function R(M) is automatically increased based on the similarity measure between the decision boundaries/loss surfaces of the AI models. The regularization parameter $\lambda$ may be automatically modified in accordance with the mechanisms of the illustrative embodiments so as to increase/decrease the influence of the regularizer on the loss function. Thus, this combination of values of the regularization parameter $\lambda$ and the regularization function R(M) provides the regularizer strength value for the regularizer.

When the gradients of the AI models are not similar to one another as indicated by the similarity measure and the comparison to the predetermined threshold value, the regularizer is automatically set to a minimum regularizer strength such that it has little if any impact on the gradients of the AI models. When the gradients are similar to one another based on the similarly measure and the threshold, the regularizer strength is automatically modified by increasing the value to thereby increase its impact on the loss function and thus, the gradient. The amount of the increase in regularizer strength may be determined automatically in any suitable manner for the particular implementation, e.g., setting the regularizer strength based on a function of the difference between the similarity measure and the predetermined threshold value, setting the regularizer strength to a default increased value, or the like. In one or more illustrative embodiments, this process may be repeated iteratively for each mini-batch, batch, or each training data element, such that incremental changes in the regularizer may be performed until the distance between the loss surfaces is maximized while minimizing accuracy loss in the outputs generated by the AI models being compared.

The regularizer modifies the gradients such that the outputs of the AI models are pushed to different classifications for the same input training data. Thus, for one of the AI models, the gradient is pushed to a class A, whereas for a second AI model, the gradient is pushed towards class B. Therefore, within a grouping of AI models, not all of the AI models will be generating the same classification output. As a result, an attacker cannot input an adversarial sample which will cause all of the AI models to generate a similar output classification, i.e. the adversarial sample is not transferred from one AI model to another.

For example, suppose that there are two AI models in an ensemble of AI models, i.e. AI models M_1 and M_2, and their loss functions are L(x,y; M_1) and L(x,y; M_2), respectively. An untargeted attack (i.e. an attack that causes the AI model to go away from the true class, as opposed to a targeted attack which attempts to divert the AI model to a given class) on a single model, e.g., M_1, with input x and its true class y can be done with gradient ascent; computing the gradient $\nabla$L(x,y; M_1) and adding it to x. That is, it is expected that x+$\epsilon\nabla$L(x,y; M_1) is misclassified by M_1 with small $\epsilon$ (e.g., 0.1). Normally, if M_1 and M_2 are trained on the same training dataset, they tend to have a similar loss surface, and hence similar $\nabla$L(x,y; M 1) and $\nabla$L(x,y; M_2). This results in a successful attack on both AI models at once with the same input (i.e., x+$\epsilon\nabla$L(x,y; M_1)).

The illustrative embodiments prevent this transfer attack by training M_1 and M_2 to have different $\nabla$L(x,y; M_1) and $\nabla$L(x,y; M_2), e.g., they have low cosine similarity. To assure this, the loss functions of the AI models are modified to include the regularizer, i.e. $\lambda$ cos($\nabla$L (x,y; M_1), $\nabla$L(x,y; M_2)) in this example implementation, to penalize similarity of their gradients. For example, $\tilde{L}(x,y; M\_k)=L(x,y; M\_k)+\lambda \cos(\nabla L(x,y; M\_1), \nabla L(x,y; M\_2))$. After optimization, it is expected that the AI models have low $L(x,y; M\_k)$ as well as low $\cos(\nabla L(x,y; M\_1), \nabla L(x,y; M\_2))$. As a result, it is found that the attack example $x+\varepsilon \nabla L(x,y; M\_1)$ has different output with M_1 and M_2.

To expand beyond two AI models, a pairwise comparison of the AI models may be performed for each pairing of AI models in a plurality of AI models, to determine for each pair, a regularizer to be applied to the AI models. The pairwise comparison may be performed in a number of different ways with regard to a grouping of AI models, e.g., a clique architecture based comparison in which all $n^2$ pairs are compared (n being the total number of AI models in the grouping), a star architecture based comparison where all AI models are compared against a single base AI model, a ring architecture based comparison in which AI model i is compared to AI model i+1% n. With the clique based comparison embodiment, any subset of the clique structure can be used. When no pairs are selected (the empty set), the training is degenerate and the same as training n models independently.

The n number of AI models may be assembled into an ensemble of AI models in which the outputs of the various AI models all operating on the same input, may be combined to generate a final output of the ensemble. The combining of the outputs of the various AI models in the ensemble may be performed in any suitable manner, such as using an averaging technique, i.e. averaging the outputs from the various models to generate a single output value, maximum vote technique, i.e. determining which output value is supported by the majority of AI models in the ensemble, or any other suitable combination function.

For example, the AI models may each output a vector output in which the vector output comprises a plurality of vector slots, each vector slot corresponding to a particular classification or output result. Values in each of the vector slots represent a confidence, or probability, score generated by the corresponding AI model indicating the AI model's prediction that the corresponding classification or output result is the correct classification or output result for the input to the AI model. Thus, for example, in an image recognition AI model, the output vector may have a plurality of vector slots, each corresponding to a possible classification of the input image, e.g., cat, dog, horse, etc. The AI model calculates a value for each of these classifications indicative of the AI model's prediction that the corresponding classification applies to the input, e.g., [0.34, 0.66, 0.0] indicating a 34% probability the input image is a cat, 66% probability the input image is a dog, and 0% probability the image is a horse. Each AI model may process the same input data and generate its own vector output and the values for each of the classifications or output results may be averaged to generate an averaged confidence or probability score in a final output vector of the ensemble. Using a maximum vote technique, each of the vector outputs of each of the AI models may be indicative of a single resulting output classification or result, e.g., "dog", and the maximum vote technique would determine which classification has the most "votes" from the AI models, e.g., the majority of the AI models indicate that "dog" is the right classification for the input image. Thus, the ensemble leverages the processing of multiple AI models to generate a correct classification or output result from processing the input.

Thus, the illustrative embodiments provide a mechanisms for ensuring that adversarial samples are not transferable between AI models by providing mechanisms for injecting a regularizer into the gradients of the AI models such that an adversarial sample does not cause each of the AI models in a grouping of AI models to generate the same output result given the adversarial sample. Hence, an attacker may be able to cause a single AI model to mistakenly generate an incorrect output, but cannot cause other AI models in the grouping to generate a similar incorrect output. Then, by combining the AI models into an ensemble, the ability for an attacker to cause the ensemble to generate an incorrect output is minimized, as the attacker cannot generate an adversarial sample that would affect all of the AI models in the ensemble in the same manner. Thus, a robust ensemble based AI model approach is provided that is hardened against such adversarial attacks.

Before discussing the various aspects of the illustrative embodiments and the improved computer operations performed by the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides mechanisms for protecting AI models, and the cognitive computing systems that implement such AI models from gradient based attacks, such as an evasion attack. In particular, the mechanisms of the illustrative embodiments, during training of a group of AI models, inject a regularizer into the gradients of AI models whose gradients are determined to be too similar to one another so that the same adversarial example does not cause both AI models to generate a same output result. This is done for each pairing of AI models in a grouping of AI models, such as a clique, star, or ring based grouping. The AI models are then combined into an ensemble with their outputs combined to generate a single output result from the ensemble. The hardened ensemble may then be used to process input data with the guarantee that an adversarial input, i.e. an input having an adversarial example, will not cause all, or even a majority, of the AI models in the ensemble to generate a same mistaken output.

Figure 1B:
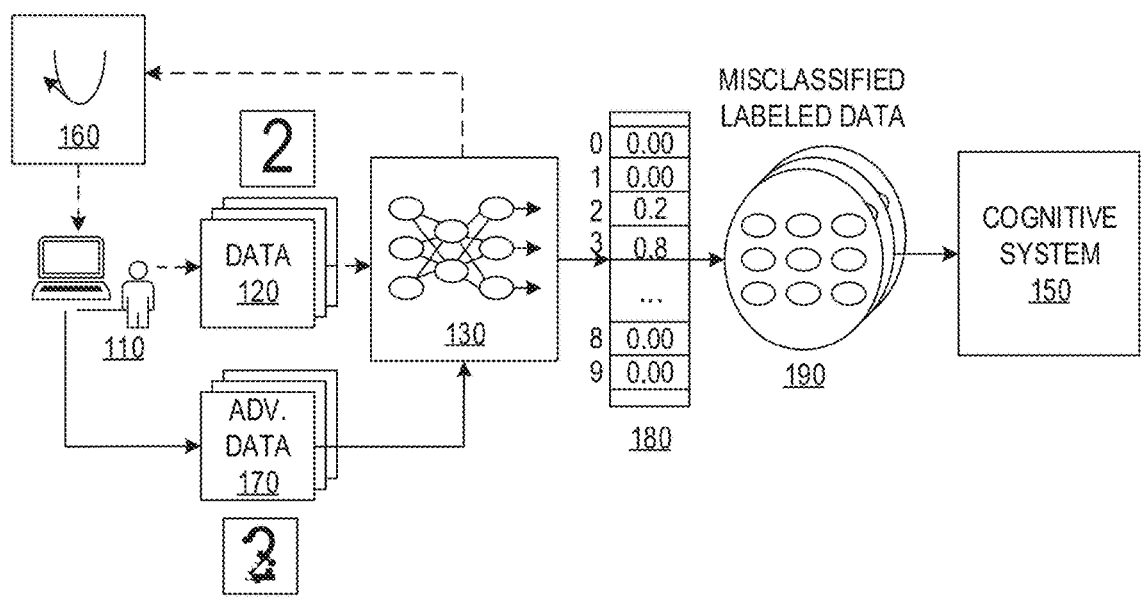

FIGS. 1A and 1B are block diagrams illustrating the adversarial input problem addressed by the present invention. In the depiction of FIGS. 1A and 1B, it is assumed that an AI model, which in these examples is assumed to be a neural network model, is trained using training data, such as through a supervised or semi-supervised process using a ground truth data structure or the like, or any other known or later developed methodology for training a neural network model. The example shown in FIGS. 1A and 1B assumes that the neural network model is being used to perform a classification operation on an image of a number to thereby classify the image of the number as a number from "0" to "9". This is used only as an example of one possible simple classification operation that the neural network model may be used to perform and is not to be considered limiting on the applications of a neural network model with which the mechanisms of the illustrative embodiments may be implemented. The mechanisms of the illustrative embodiments may be utilized with the inputs/outputs of any neural network models, machine learning models, or the like, regardless of the particular artificial intelligence operations performed by the neural network models, machine learning models, or the like. Moreover, although not shown explicitly in FIGS. 1A and 1B, the neural network model, machine learning model, deep learning or cognitive model, or the like (collectively referred to as AI models herein), may be part of a more complex cognitive computing system that implements such a model to perform a complex cognitive operation, such as natural language processing, image analysis, patient treatment recommendation, medical imaging analysis, cognitive security system, or any of a plethora of other cognitive operations, as described hereafter. Furthermore, as noted above, with regard to the particular mechanisms of the illustrative embodiments, the neural network model, machine learning model, etc. may be one of a plurality of such AI models implemented as part of an ensemble.

As shown in FIG. 1A, under normal operation, the neural network model 130 receives a set of input data 120 from a data source 110, which is processed through the neural network model to generate a vector output 135. In the depicted example of FIG. 1A, the trained neural network 130 performs a classification operation for classifying the input data set 120. The output of the classification operation is a vector 135 of confidence or probability values where each slot of the vector output 135 represents a separate possible classification of the input data set 120. The training of a neural network, machine learning, deep learning, or other artificial intelligence model is generally known in the art and it is assumed that any such methodology may be used to perform such training. The training generally involves modifying weighting values associated with various features scored by nodes of the model based on training data sets to cause the model to output a correct vector output 135 labeling the input data set 120 correctly based on supervised or semi-supervised feedback. The neural network model 130 processes the input data set 120 through the various levels of nodes in the neural network model 130 to generate at the output nodes probability values corresponding to the particular class or label that the output node represents, i.e. the output node's value indicates the probability that the class or label of the corresponding vector slot applies to the input data set 120.

Thus, in a classification operation, each vector slot of the vector output 135 corresponds to a classification (or class) into which the input data may be classified, with a corresponding output node of the neural network model 130 providing the value to be stored in the corresponding vector slot. The value in the vector slot represents a probability or confidence that the input data is properly classified into the corresponding class associated with the vector slot. For example, in the depiction of FIGS. 1A and 1B, the classes are the numerical values 0 to 9, each numerical value being associated with a separate vector slot, and each vector slot having a value ranging from 0.00 (0% probability) to 1.00 (100% probability) indicating a probability that the corresponding class 0 to 9 is the correct class for the input data 120. For example, if the input data 120 represents an image of the number "2", then if the neural network model 130 has been trained correctly, then processing of the input data 120 by the neural network model 130 will result in a relatively high probability that the classification of the input data 120 is that it represents the number "2" and hence is in class "2." As shown in FIG. 1A, the probability for class "2" is 0.90 while the probability for class "3" is 0.10 and all other classes have a 0.00 probability. It should be appreciated that while the figure shows a precision of two decimal places for the probability values, this is merely used for illustration purposes and any desirable precision of the values stored in the vector output 135 may be used without departing from the spirit and scope of the present invention.

While this is a simple example used for illustrative purposes, it should be appreciated that the number of classifications and corresponding labels, as well as the corresponding vector output 135, may be quite complex. As another example, these classifications may be, for example, in a medical imaging application where internal structures of human anatomy are being classified in a patient's chest, e.g., an aorta, a heart valve, a left ventricle, right ventricle, lungs, etc. It should be appreciated that the vector output 135 may comprise any number of potential vector slots, or classifications, at various levels of granularity depending on the particular application and implementation, and the vector output 135 may be of various sizes correspondingly.

The resulting vector output 135 is used to generate labels or metadata that is associated with the input data 120 to generate labeled data set 140. A labeled data set 140 is a set of output data generated by the trained neural network model 130 where the unlabeled input data is augmented with additional tags or labels of meaningful information for the particular cognitive operation for which the data is to be used. For example, in a patient treatment recommendation cognitive computing system, the labeled data may comprise labels, tags, or annotations that specify various medical concepts with which the data is associated, e.g., a disease, a treatment, a patient's age, a patient's gender, etc. In the depicted example, the operation of the neural network model 130 is to classify a portion of an input image specified in a set of input data 120 into one of 10 categories representing numerical values that the portion of the input image represents, e.g., classes "0" to "9". Hence, the label that is affixed to a set of input data 120 may be a label of "0" or "1" or "2", etc.

Thus, the classification generated by the neural network 130 is used to associate an appropriate label of one or more of the classes in the vector output 135 based on the corresponding values stored in the vector slots for those classes. For example, the highest ranking class may be selected for use in labeling the input data. In some implementations, multiple classes may be represented in the labels generated and associated with the input data 120 to generate the labeled data 140, e.g., classes having a probability value greater than a predetermined threshold may have labels generated and associated with the input data 120 to generate the labeled data 140.

The labeled data 140 is then input to the cognitive computing system (or simply "cognitive system") 150 for performance of cognitive operations on the labeled data 140. The particular cognitive operation performed by the cognitive system 150 depends on the cognitive system and may be any of a plethora of different types of cognitive operations. Examples of cognitive operations include various types of decision making operations or decision support operations, such as security system based operations for controlling access to facilities, data, or any other secure asset. Such security system cognitive operations may employ the labeled data 140 to perform facial recognition, voice print recognition, biometrics based decision making, or the like. Other implementations of the cognitive system 150 may involve various types of natural language processing, such as for question answering or request processing, image analysis, such as for medical image analysis for patient diagnosis and treatment recommendations, or any other evaluation of an input data for purposes of making decisions and generating results in which the cognitive system emulates human thought processes.

As shown in FIG. 1B, assuming that the data source 110 is an attacker 110 performing a white box gradient based attack, such as an evasion attack, for example, the attacker 110 may attempt to cause the neural network 130 to misclassify the input data 120 by modifying the input data 120 to include imperceptible manipulations on the input data 120 and thereby generate adversarial input 170, i.e. input having one or more adversarial samples or examples. In order to generate the adversarial data 170, the attacker 110 may analyze the loss surface 160 of the neural network model 130 to determine an appropriate gradient that shows the least manipulation of the input data that causes the greatest change in the classification performed by the neural network model 160. For example, the attacker may access the neural network, or a copy of the neural network, or may perform a model stealing attack by querying the model to label unlabeled data and train their own copy of the model. Thereafter, obtaining the loss surface is straightforward, as it is defined inside the neural network. For example, if the neural network is a function f, mapping input x to f(x), the loss given x and its label y is $L(f(x),y)$. This function L is usually defined when the neural network is defined and thus, is part of the neural network. Typical examples include cross entropy loss, and mean squared error. The gradient the attacker needs to compute is the gradient of $L(f(x),y))$.

The selected gradient from the loss surface 160 is then used to inject manipulations into the input data 120 to generate the adversarial input data 170 which is intended to fool the neural network model 130 to misclassify the actual input data 120 due to the injected manipulations. Thus, rather than generating the output vector 135 of FIG. 1A for the input data 120, the neural network model 130 generates the manipulated output vector 180 in FIG. 1B based on the adversarial input data 170, which causes a misclassification of the input data 120. In this case, rather than the input image of the value "2" being recognized as having class "2", the neural network model 130 processes the adversarial input data 170 and determines there to be a higher probability that the input data represents the numerical value "3" and outputs a corresponding manipulated output vector 180. The result is a misclassified labeled data set 190 that is input to the cognitive system 150 which in turn performs an incorrect cognitive operation due to the misclassification by the neural network 130, due to the adversarial input 170, which is reflected in the misclassified labeled data set 190. Thus, one can imagine that an attacker may cause the neural network 130 to perceive an invalid input as a valid input, or vice versa, and may be able to obtain access to assets that the attacker may otherwise not be permitted access, for example.

As mentioned above, while some defenses have been devised against such adversarial attacks, these defenses focus on single models and furthermore, do not address the potential transferability of adversarial samples from one model to another. The illustrative embodiments provide mechanisms for hardening cognitive computing systems that employ such AI models against adversarial attacks by providing mechanisms to ensure that adversarial samples are not transferred between AI models, and by providing an ensemble of such AI models for providing the output result to the other downstream cognitive computing system mechanisms that rely on the output of the AI model(s). By using both a defense that prevents transferability of adversarial examples or samples, and uses an ensemble of AI models to provide a final output, the possibility that an attacker can cause the cognitive computing system to perform an incorrect cognitive operation based on the output of the AI model ensemble is minimized.

Figure 2A:
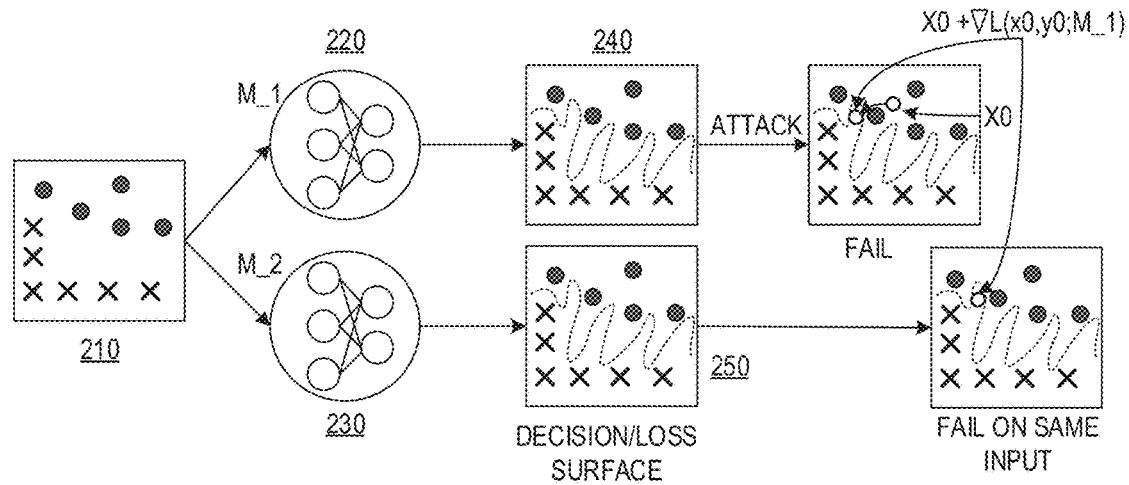
FIG. 2A is an example diagrams illustrating the problem of attack transferability between AI models addressed by the illustrative embodiments.

FIG. 2A is an example diagrams illustrating the problem of attack transferability between AI models addressed by the illustrative embodiments. As shown in FIG. 2A, and described previously above, two AI models M_1 220 and M_2 230 are trained using the same training dataset 210. As a result, the AI models 220-230 will have similar loss surfaces and decision boundaries, as shown in elements 240, 250. Assume that an attacker attempts to attack AI model M_1 220 with an attack input $x_0 + \nabla L(x_0, y_0; M\_1)$, the attack input will cause the AI model M_1 220 to fail, i.e. generate an incorrect classification output with high confidence; in other words, $M\_1(x_0+\nabla L(x_0,y_0; M\_1) \neq y_0$. Because both AI models 220 and 230 have similar loss surfaces 240, 250, the same attack will also cause the AI Model M_2 230 to fail as well. Thus, if the ensemble comprises AI models M_1 220 and M_2 230, the ensemble will generate an incorrect result with high confidence.

Figure 2B:
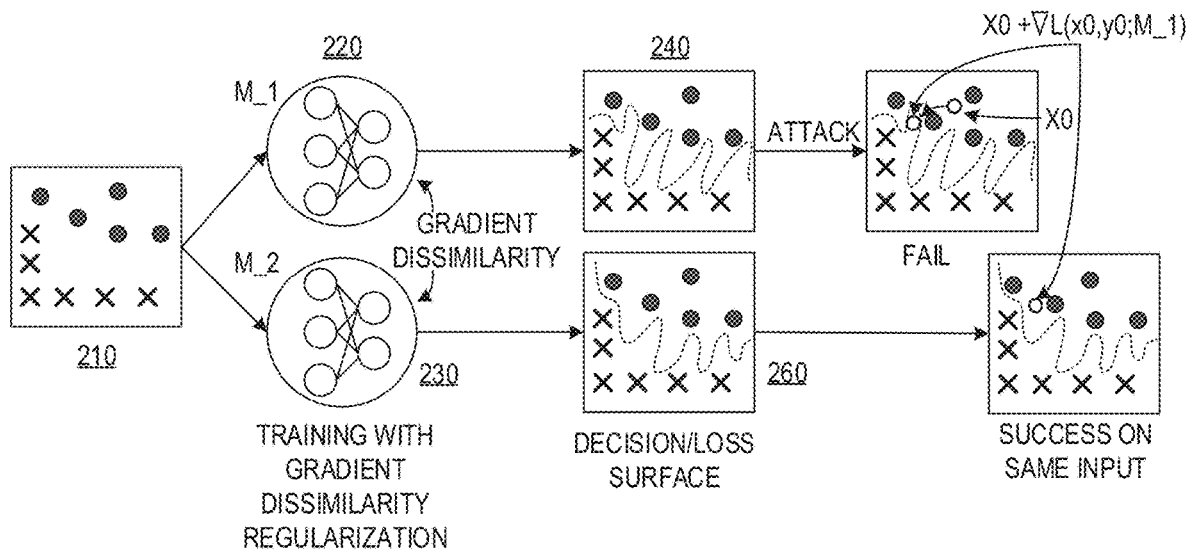
FIG. 2B is an example diagram illustrating the overall concept of diversifying the gradients of a pair of AI models in accordance with one illustrative embodiment.

FIG. 2B is an example diagram illustrating the overall concept of diversifying the gradients of a pair of AI models in accordance with one illustrative embodiment. As shown in FIG. 2B, again, the AI models 220 and 230 are trained with the same training dataset 210, however due to the mechanisms of the illustrative embodiments which determine whether the loss surfaces of the trained AI models 220 and 230 are sufficiently similar to one another, and an inject a regularizer into the loss function during training of the AI models 220, 230 when the loss surfaces are sufficiently similar, the resulting loss surfaces and decision boundaries 240, 260 are diverted from one another so that the loss surfaces/decision boundaries, are different from one another. This diversion is accomplished by modifying at least one of the loss surfaces, e.g., in the depicted example, loss surface 250 is diverted to generate loss surface 260 due to the injection of the regularizer, during training while at least one of the AI models 220, 230 still provides a correct classification output for an adversarial example. As a result, the attack $\nabla L(x,y; M\_1)$ on AI model M_1 220 is not transferred to the other AI model M_2 230.

Figure 3:
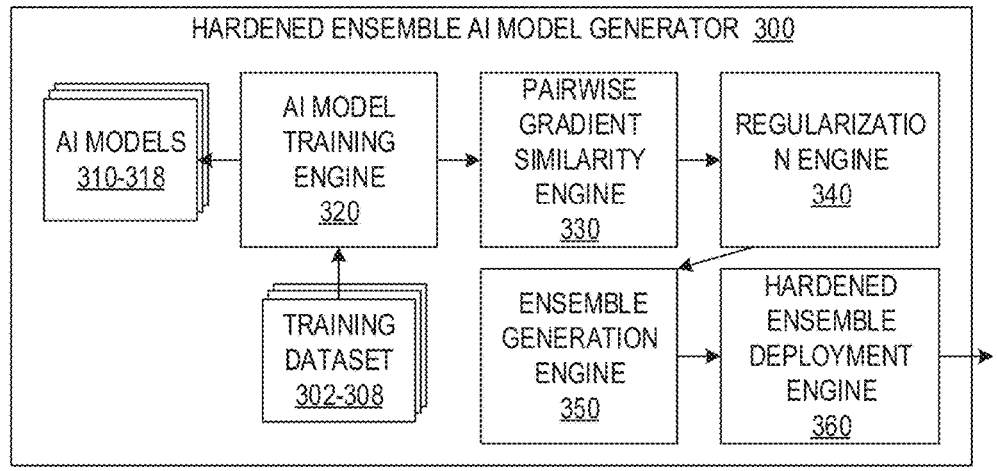
FIG. 3 is an example block diagram of the primary operational components of a hardened ensemble AI model generator in accordance with one illustrative embodiment.

FIG. 3 is an example block diagram of the primary operational components of a hardened ensemble AI model generator in accordance with one illustrative embodiment. As shown in FIG. 3, the hardened ensemble AI model generator 300 comprises one or more training datasets 302-308, a plurality of AI models 310-318, an AI model training engine 320, a pairwise gradient similarity engine 330, a regularization engine 340, an ensemble generation engine 350, and a hardened ensemble deployment engine 360. The training dataset(s) 302-308 comprise data and ground truth labels for training AI models 310-318. The AI model training engine 320 comprises logic for training the AI models 310-318 using the training dataset(s) 302-308 and a corresponding training algorithm of a desired implementation, e.g., stochastic gradient descent, batch gradient descent, mini-batch gradient descent, etc. The operation for training an AI model 310-318 using a training algorithm and training data is generally known in the art, and is outlined above, and thus, a more detailed explanation is not provided herein.

As part of the training of the AI models 310-318, the AI model training engine 320 is further provided with logic for operating in conjunction with the pairwise gradient similarity engine 330 and regularization engine 340 as described herein. The ensemble generation engine 350 and hardened ensemble deployment engine 360 operate on the trained AI models 310-318 such that an ensemble of trained AI models is generated and deployed for operation with a cognitive computing system, cloud AI service, stand-alone AI model implementation, or the like.

With the mechanisms of the illustrative embodiments, two or more of the AI models 310-318 are trained by the AI model training engine 320 such that an adversarial sample against one AI model, e.g., AI model 310, will not transfer to a second AI model, e.g., AI model 312, in the two or more AI models 310-318. This is accomplished by co-training the AI models 310-318 using the training dataset(s) 302-308 and a training algorithm employed by the AI model training engine 320, and adding a regularizing term, or "regularizer", that penalizes against transferrable attacks. The regularizer is added to the loss function of one or more of the AI models 310-318 being trained based on a determination of a similarity of the gradients of the AI models 310-318 as determined by the pairwise gradient similarity engine 330. That is, for each pair of AI models 310-318 being co-trained by the AI model training engine 320, after a predetermined number of gradient steps during the training, the gradients of the two AI models in the pairing are compared by the pairwise gradient similarity engine 330. This comparison generates a similarity or dissimilarity measure, depending on the desired implementation, which indicates a degree to which the gradients of the two AI models are similar/dissimilar given the same input training data. This similarity/dissimilarity measure may be compared to a threshold measure that indicates AI models whose gradients are too similar, or not sufficiently dissimilar.

Based on the similarity/dissimilarity measure generated by the pairwise gradient similarity engine 330, and a relationship of the similarity/dissimilarity measure to the predetermined threshold value, e.g., equal to or greater than the threshold value, lower than the threshold value, etc., the pairwise gradient similarity engine 330 may invoke the regularization engine 340 which injects a regularizer into the gradients of one or both of the AI models 310-318 in the pairing. For example, in one illustrative embodiment in which minibatch gradient descent is used to optimize the AI model, for each minibatch, the gradient of the loss is computed with respect to the input, and a regularizer is added if the gradients between the two AI models in the pairing are too similar.

The regularizer may be any suitable distance measure, such as a cosine similarity, a LP norm, or the like, such that a distance between the gradients is maximized during the training process while minimizing the accuracy loss, e.g., cross entropy loss, of the AI models 310-318. The regularizer modifies the gradients such that the outputs of the AI models are pushed to different classifications for the same input training data. As a result, within a grouping of AI models, not all of the AI models will be generating the same classification output. As a result, an attacker cannot input an adversarial sample which will cause all of the AI models to generate a similar output classification, i.e. the adversarial sample is not transferred from one AI model to another.

It should be appreciated that this injection of the regularizer by the regularization engine 340 may be performed with regard to each batch (e.g., for batch gradient descent), mini-batch (e.g., for mini-batch gradient descent), or each training data example (e.g., for stochastic gradient descent), depending on the particular training algorithm being employed by the AI model training engine 320. Moreover, the pairwise gradient similarity evaluations performed by the pairwise gradient similarity engine 330, and corresponding injection of regularizers by the regularization engine 340, may be performed with regard to each pairing of AI models 310-318 in a group of AI models 310-318. The pairwise comparisons of similarity may be performed in accordance with the particular desired architecture of the implementation, e.g., clique, star, ring, etc. Thus, for example, for a clique based comparison, all $n^2$ pairs are compared, where n is the total number of AI models 310-318. For a star architecture, all AI models 312-318 are compared against a single base AI model 310. For a ring architecture, each AI model is compared to the next AI model in the ring architecture, e.g., AI model i is compared to AI model i+1% n.

Once the AI models 310-318 are trained in this manner, with injected regularizers as needed based on the pairwise gradient similarity evaluations, a group of two or more of the AI models 310-318 may be compiled into an ensemble of trained AI models by the ensemble generation engine 350. The ensemble generation engine 350 combines the trained AI models 310-318 and provides logic for combining the outputs of the individual trained AI models 310-318 to generate a single output from the ensemble. For example, the ensemble generation engine 350 generates logic for a combination of the AI models 310-318 that takes the outputs of the various AI models 310-318 and generates a final output for the ensemble from the individual outputs of the various AI models 310-318 using a sum, average, maximum vote, or any other function of the outputs of the individual AI models 310-318 that is deemed appropriate for the particular implementation. In some cases, this combination may utilize a weighted combination of the various outputs such that the outputs of some AI models are weighted differently than others in the final output that is generated. The final output that is generated is indicative of the consensus of the AI models 310-318 as to the proper classification or result output that should be generated based on the particular input processed.

Thus, the trained AI models 310-318 are packaged together with the output combination logic to generate a hardened ensemble for deployment. The hardened ensemble deployment engine 360 comprises the logic to deploy the ensemble to its deployment environment for runtime use. For example, the hardened ensemble may be deployed in a deployment environment comprising a cognitive computing system which operates based on the final output generated by the hardened ensemble. For example, the cognitive computing system may operate based on image recognition or another type of classification performed by the AI models 310-318 of the hardened ensemble. In such an embodiment, the cognitive computing system may receive an input image that is classified by the hardened ensemble which generates a final classification output. This final classification output is then used as a basis for performing additional cognitive operations by the other mechanisms of the cognitive computing system using artificial intelligence to provide useful results, e.g., medical diagnoses, treatment recommendations, control signals to control other systems, e.g., braking systems of an automobile, collision warning notifications for a vehicle, controlling entry to physical premises based on facial image recognition, biometric authentication, etc., or any of a plethora of other cognitive computing operations.

It should be appreciated that the hardened ensemble is hardened against adversarial attacks, such as gradient based attacks, through the specific improved co-training of the AI models using a modified machine learning process involving the injection of a regularizer based on the measuring of a similarity of gradients in AI models. Through this process, transferability of adversarial inputs, e.g., adversarial examples or samples, from one AI model to another is prevented. Thus, ensembles of AI models are hardened against such adversarial inputs. That is, while the adversarial input may be able to attack a single AI model in the ensemble, the other AI models in the ensemble will not fall prey to the same attack. As a result, the cognitive computing system employing the ensemble to perform classification operations or generate other results upon which the cognitive computing system operates, are in turn hardened against such attacks.

It should also be noted that the resulting ensemble of AI models may be used at runtime directly for their functionality, may be integrated into another computing system, such as a cognitive computing system, or may be configured to provide their results to another separate computing system for further computer operations, such as in the case of an AI model cloud computing service or the like. For example, the ensemble of AI models may be deployed on one or more server computing devices which are accessible via one or more data networks such that input data may be provided by a requestor computing device to the ensemble for processing, and the ensemble may provide results back to the requestor computing device for further computing operations. In other illustrative embodiments, the ensemble may be deployed in a local computing system which not only hosts the ensemble but also the data upon which the ensemble operates such that all of the processing is contained within the same local computing system. Of course, there are additional embodiments that bring these two illustrative embodiments with varying levels of localized and distributed computing environments.

Figure 4:
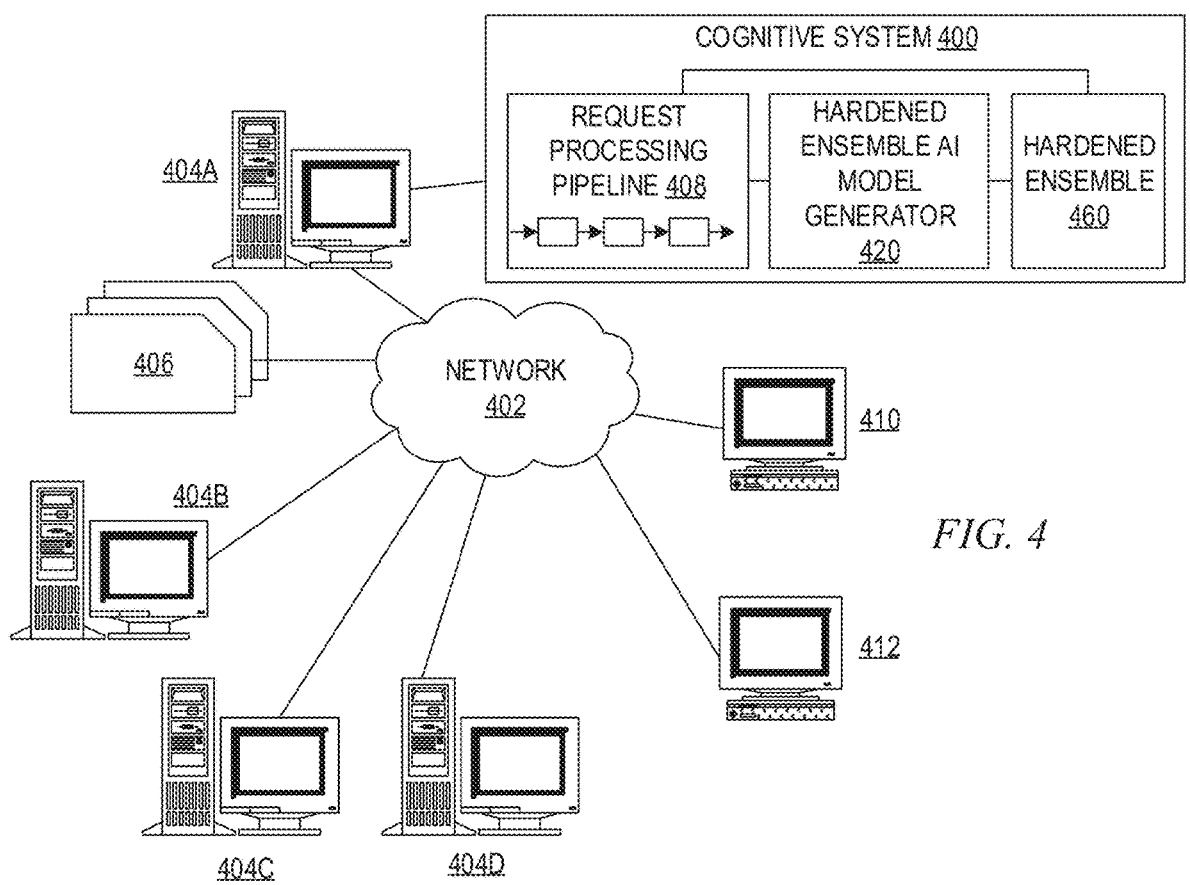
FIG. 4 is an example block diagram of a cognitive computing system implementing a hardened ensemble of AI models in accordance with one illustrative embodiment.
Figure 5:
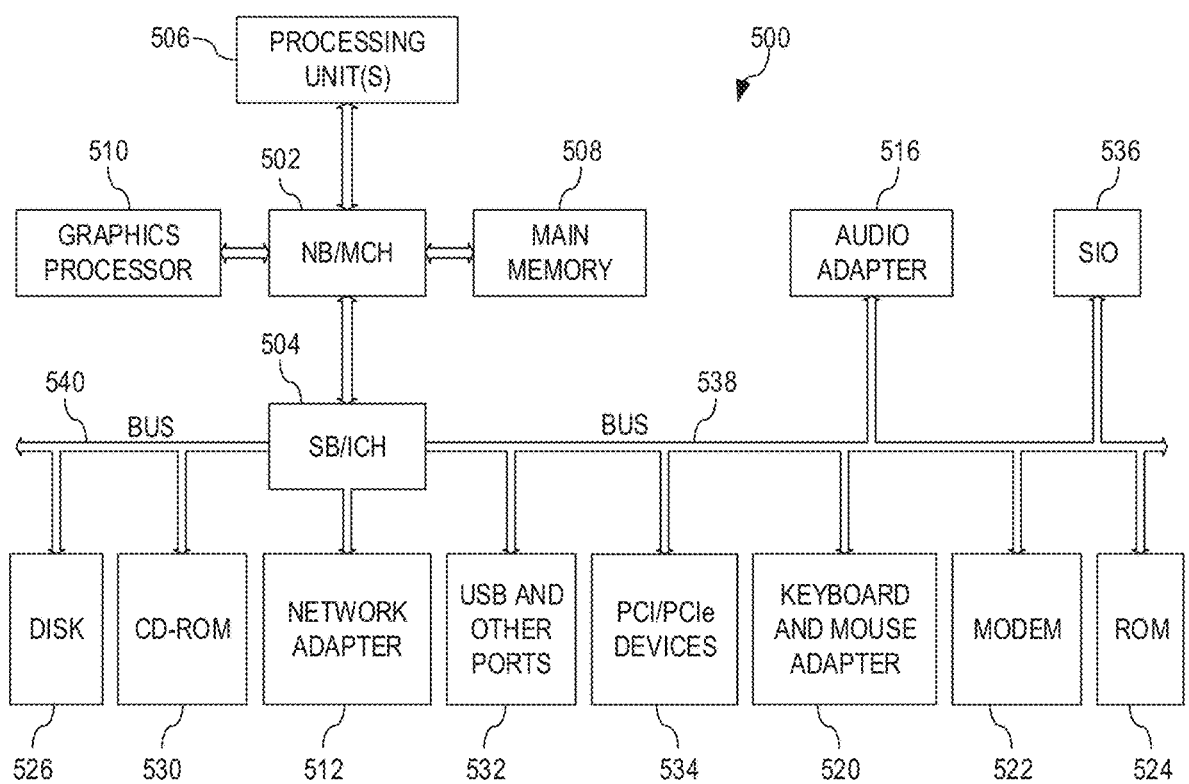
FIG. 5 is an example diagram of a data processing system in which aspects of the illustrative embodiments may be implemented.
Figure 6:
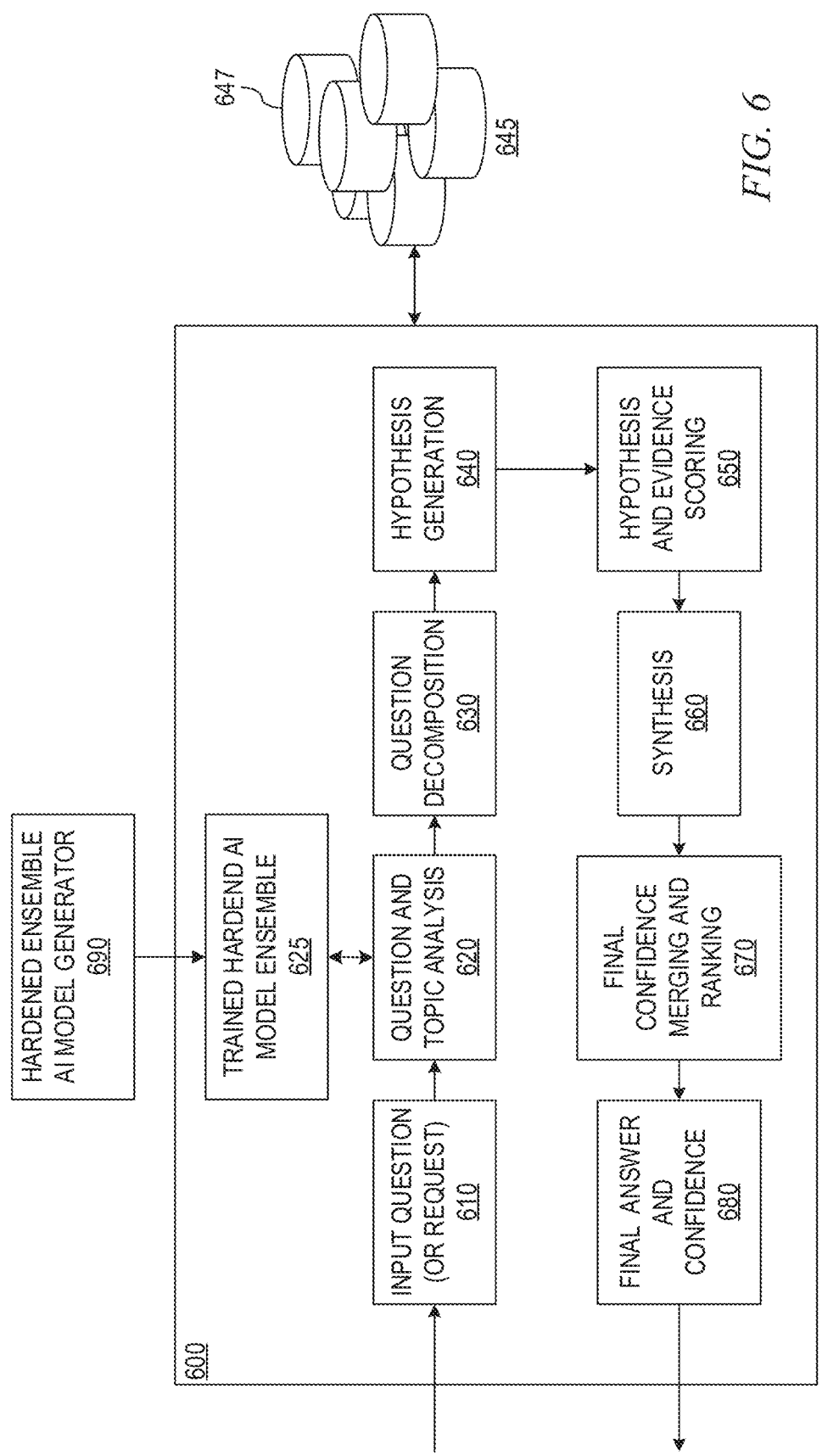
FIG. 6 is an example diagram illustrating an implementation of the hardened ensemble AI model generator with a request processing pipeline of a cognitive computing system in accordance with one illustrative embodiment.

In order to provide some examples of computing environments and computing devices in which aspects of the illustrative embodiments may be provided, FIGS. 4-6 are provided hereafter. It should be appreciated that FIGS. 4-6 are only examples and are not intended to assert or imply any limitation with regard to the environments in which aspects or embodiments of the present invention may be implemented. Many modifications to the depicted environments may be made without departing from the spirit and scope of the present invention. Moreover, the mechanisms of the illustrative embodiments are not limited to implementation with a cognitive computing system, but may be implemented with any artificial intelligence (AI) based computing system to perform operations to support later downstream AI operations. The cognitive computing system described hereafter is only intended to be one example of an implementation in which the mechanisms of the illustrative embodiments improve the functionality of the computing system in which the mechanisms are implemented.

FIGS. 4-6 are directed to describing an example cognitive computing system (or simply "cognitive system") which implements a request processing pipeline, such as a Question Answering (QA) pipeline (also referred to as a Question/Answer pipeline or Question and Answer pipeline) for example, request processing methodology, and request processing computer program product with which the mechanisms of the illustrative embodiments are implemented. These requests may be provided as structured or unstructured request messages, natural language questions, or any other suitable format for requesting an operation to be performed by the cognitive system. In some illustrative embodiments, the requests may be in the form of input data sets that are to be classified in accordance with a cognitive classification operation performed by an ensemble of two or more machine learning, neural network, deep learning, or other artificial intelligence based models (collectively referred to as AI models herein) that are implemented by, or otherwise operate in conjunction with, the cognitive system. These AI models, in some illustrative embodiments, provide a classification output that classifies the input into one of a plurality of predefined classifications. In other illustrative embodiments, the AI models may provide other results that may be utilized by downstream cognitive computing system logic.

The input data sets may represent various types of input data depending upon the particular implementation, such as audio input data, image input data, textual input data, or the like. For example, in one possible implementation, the input data set may represent a medical image, such as an x-ray image, CT scan image, MRI image, or the like, that is to have portions of the image, or the image as a whole, classified into one or more predefined classifications. In other possible implementations, the input data set may represent facial images, images of text, biometric images, natural language text content, or any other type of input that may be represented as data and for which a classification operation is to be performed so as to perform a cognitive operation by a cognitive system.

It should be appreciated that classification of input data may result in a labeled set of data that has labels or annotations representing the corresponding classes into which the non-labeled input data set is classified. This may be an intermediate step in performing other cognitive computing operations by the cognitive computing system that support decision making by human users, e.g., the cognitive system may be a decision support system. For example, in a medical domain, the cognitive computing system may operate to perform medical image analysis to identify anomalies for identification to a clinician, patient diagnosis and/or treatment recommendation, drug interaction analysis, or any of a plethora of other possible decision support operations. In a security domain, the cognitive computing system may operate to control access to physical premises, data assets, computing assets, or any other type of asset to which access is to be restricted. In other domains, the cognitive system may perform different types of decision making operations or decision support operations based on the desired implementation, e.g., in a vehicle control system, the cognitive computing system may control the application of vehicle braking to avoid collisions based on image recognitive operations.

It should be appreciated that the cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests (or questions in implementations using a QA pipeline), depending on the desired implementation. For example, in some cases, a first request processing pipeline may be trained to operate on input requests directed to a medical image analysis, while a second request processing pipeline may be configured and trained to operate on input requests concerning patient electronic medical record (EMR) analysis involving natural language processing. In other cases, for example, the request processing pipelines may be configured to provide different types of cognitive functions or support different types of applications, such as one request processing pipeline being used for patient treatment recommendation generation, while another pipeline may be trained for financial industry based forecasting, etc.

Moreover, each request processing pipeline may have their own associated corpus or corpora that they ingest and operate on, e.g., one corpus for medical treatment documents and another corpus for financial industry domain related documents in the above examples. In some cases, the request processing pipelines may each operate on the same domain of input questions but may have different configurations, e.g., different annotators or differently trained annotators, such that different analysis and potential answers are generated. The cognitive system may provide additional logic for routing input questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

As noted above, one type of request processing pipeline with which the mechanisms of the illustrative embodiments may be utilized is a Question Answering (QA) pipeline. The description of example embodiments of the present invention hereafter will utilize a QA pipeline as an example of a request processing pipeline that may be augmented to include mechanisms in accordance with one or more illustrative embodiments. It should be appreciated that while the present invention will be described in the context of the cognitive system implementing one or more QA pipelines that operate on an input question, the illustrative embodiments are not limited to such. Rather, the mechanisms of the illustrative embodiments may operate on requests that are not posed as "questions" but are formatted as requests for the cognitive system to perform cognitive operations on a specified set of input data using the associated corpus or corpora and the specific configuration information used to configure the cognitive system. For example, rather than asking a natural language question of "What diagnosis applies to patient P?", the cognitive system may instead receive a request of "generate diagnosis for patient P," or the like. It should be appreciated that the mechanisms of the QA system pipeline may operate on requests in a similar manner to that of input natural language questions with minor modifications. In fact, in some cases, a request may be converted to a natural language question for processing by the QA system pipelines if desired for the particular implementation.

As will be discussed in greater detail hereafter, the illustrative embodiments may be integrated in, augment, and extend the functionality of these QA pipeline, or request processing pipeline, mechanisms to protect the AI models implemented in these pipelines, or by the cognitive system as a whole, from gradient based attacks, such as an evasion attack or the like, and specifically to do so by providing mechanisms that prevent the transferability of adversarial inputs from one AI model to another within an ensemble of AI models used by the cognitive system. In particular, in portions of the cognitive system in which the trained neural network models, machine learning models, deep learning models, or other AI models, are employed to generate labeled data set outputs, the mechanisms of the illustrative embodiments may be implemented to train an ensemble of neural networks, machine learning, or AI models so as to process input data and generate a consensus result based on the processing where this consensus result is hardened against adversarial inputs causing a misclassification or mistaken result because of the way in which the AI models in the ensemble are trained using an injected regularizer when necessary, and the ensemble combination of outputs of the AI models.

As the mechanisms of the illustrative embodiments may be part of a cognitive system and may improve the operation of the cognitive system by protecting it from model stealing attacks, it is important to first have an understanding of how cognitive systems and question and answer creation in a cognitive system implementing a QA pipeline is implemented before describing how the mechanisms of the illustrative embodiments are integrated in and augment such cognitive systems and request processing pipeline, or QA pipeline, mechanisms. It should be appreciated that the mechanisms described in FIGS. 4-6 are only examples and are not intended to state or imply any limitation with regard to the type of cognitive system mechanisms with which the illustrative embodiments are implemented. Many modifications to the example cognitive system shown in FIGS. 4-6 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. This logic may implement one or more models, such as a neural network model, a machine learning model, a deep learning model, or other AI model, that may be trained for particular purposes for supporting the particular cognitive operations performed by the cognitive system. In accordance with the mechanisms of the illustrative embodiments, the logic further implements a hardened ensemble AI model generator for training an ensemble of AI models, e.g., neural networks, using a methodology based on gradient similarities, injection of regularizers, and ensemble generation. In this way, a hardened ensemble of AI models is generated that is fortified against gradient based attacks.

The logic of the cognitive system implements the cognitive computing operation(s), examples of which include, but are not limited to, question answering, identification of related concepts within different portions of content in a corpus, security operations for controlling access to premises or assets, intelligent search algorithms, such as Internet web page searches, for example, medical diagnostic and treatment recommendations, other types of recommendation generation, e.g., items of interest to a particular user, potential new contact recommendations, etc., image analysis, audio analysis, and the like. The types and number of cognitive operations that may be implemented using the cognitive system of the illustrative embodiments are vast and cannot all be documented herein. Any cognitive computing operation emulating decision making and analysis performed by human beings, but in an artificial intelligence or cognitive computing manner using an ordered combination of computer operations that are different from, and would not be performed by, a human mental process, is intended to be within the spirit and scope of the present invention.

IBM Watson™ is an example of one such cognitive computing system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive computing systems (or simply "cognitive systems") provide mechanisms for answering questions posed to these cognitive systems using a Question Answering pipeline or system (QA system) and/or process requests which may or may not be posed as natural language questions. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledge-base) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

The QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 4 depicts a schematic diagram of one illustrative embodiment of a cognitive system 400 implementing a request processing pipeline 408, which in some embodiments may be a question answering (QA) pipeline, in a computer network 402. For purposes of the present description, it will be assumed that the request processing pipeline 408 is implemented as a QA pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety. The cognitive system 400 is implemented on one or more computing devices 304A-D (comprising one or more processors and one or more memories, and potentially any other computing device elements generally known in the art including buses, storage devices, communication interfaces, and the like) connected to the computer network 402. For purposes of illustration only, FIG. 4 depicts the cognitive system 400 being implemented on computing device 404A only, but as noted above the cognitive system 400 may be distributed across multiple computing devices, such as a plurality of computing devices 404A-D. The network 402 includes multiple computing devices 404A-D, which may operate as server computing devices, and 410-412 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 400 and network 402 enables question processing and answer generation (QA) functionality for one or more cognitive system users via their respective computing devices 410-412. In other embodiments, the cognitive system 400 and network 402 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 400 may be used with components, systems, subsystems, and/or devices other than those that are depicted herein.

The cognitive system 400 is configured to implement a request processing pipeline 408 that receive inputs from various sources. The requests may be posed in the form of a natural language question, natural language request for information, natural language request for the performance of a cognitive operation, or the like. Alternatively, the "request" may simply be the input of data that is intended to be operated on by the cognitive system, e.g., images, text, audio input, or the like, which is to be classified by the hardened model of the illustrative embodiments and then operated on by cognitive processes to generate a result of a cognitive operation. For example, the cognitive system 400 receives input from the network 402, a corpus or corpora of electronic documents 406, cognitive system users, image capture devices, audio capture devices, biometric scanners, textual message interception devices, and/or other data sources and other possible sources of input.

In one embodiment, some or all of the inputs to the cognitive system 400 are routed through the network 402. The various computing devices 404A-D on the network 402 include access points for content creators and cognitive system users. Some of the computing devices 404A-D include devices for a database storing the corpus or corpora of data 406 (which is shown as a separate entity in FIG. 4 for illustrative purposes only). Portions of the corpus or corpora of data 406 may also be provided on one or more other network attached storage devices, in one or more databases, or other computing devices not explicitly shown in FIG. 4. The network 402 includes local network connections and remote connections in various embodiments, such that the cognitive system 400 may operate in environments of any size, including local and global, e.g., the Internet.

Depending on the particular domain and implementation of the cognitive system, the corpus or corpora of data 406 may take many different forms. In a natural language implementation, the corpus or corpora 406 may be composed of natural language unstructured documents, structured documents, or the like. In a domain in which image analysis is being performed, the corpus or corpora 406 may include image data for various types of entities. In an audio analysis domain, the corpus or corpora 406 may contain audio patterns representing different entities or sources of audible sounds. The content of the corpus or corpora 406 may vary depending on the type of data needed to perform cognitive operations.

In one embodiment, the content creator creates content in a document of the corpus or corpora of data 406 for use as part of a corpus of data with the cognitive system 400. The document includes any file, text, article, or source of data for use in the cognitive system 400. Cognitive system users access the cognitive system 400 via a network connection or an Internet connection to the network 402, and input questions/requests to the cognitive system 400 that are answered/processed based on the content in the corpus or corpora of data 406. In one embodiment, the questions/requests are formed using natural language. The cognitive system 400 parses and interprets the question/request via a pipeline 408, and provides a response to the cognitive system user, e.g., cognitive system user 410, containing one or more answers to the question posed, response to the request, results of processing the request, or the like. In some embodiments, the cognitive system 400 provides a response to users in a ranked list of candidate answers/responses while in other illustrative embodiments, the cognitive system 400 provides a single final answer/response or a combination of a final answer/response and ranked listing of other candidate answers/responses.

The cognitive system 400 implements the pipeline 408 which comprises a plurality of stages for processing an input question/request based on information obtained from the corpus or corpora of data 406. The pipeline 408 generates answers/responses for the input question or request based on the processing of the input question/request and the corpus or corpora of data 406. The pipeline 408 will be described in greater detail hereafter with regard to FIG. 6.

In some illustrative embodiments, the cognitive system 400 may be the IBM Watson™ cognitive system available from International Business Machines Corporation of Armonk, New York, which is augmented with the mechanisms of the illustrative embodiments described herein. As outlined previously, a pipeline of the IBM Watson™ cognitive system receives an input question or request which it then parses to extract the major features of the question/request, which in turn are then used to formulate queries that are applied to the corpus or corpora of data 406. Based on the application of the queries to the corpus or corpora of data 406, a set of hypotheses, or candidate answers/responses to the input question/request, are generated by looking across the corpus or corpora of data 406 for portions of the corpus or corpora of data 406 (hereafter referred to simply as the corpus 406) that have some potential for containing a valuable response to the input question/response (hereafter assumed to be an input question). The pipeline 408 of the IBM Watson™ cognitive system then performs deep analysis on the language of the input question and the language used in each of the portions of the corpus 406 found during the application of the queries using a variety of reasoning algorithms.

The scores obtained from the various reasoning algorithms are then weighted against a statistical model that summarizes a level of confidence that the pipeline 408 of the IBM Watson™ cognitive system 400, in this example, has regarding the evidence that the potential candidate answer is inferred by the question. This process is be repeated for each of the candidate answers to generate ranked listing of candidate answers which may then be presented to the user that submitted the input question, e.g., a user of client computing device 410, or from which a final answer is selected and presented to the user. More information about the pipeline 408 of the IBM Watson™ cognitive system 400 may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As noted above, while the input to the cognitive system 400 from a client device may be posed in the form of a natural language question, the illustrative embodiments are not limited to such. Rather, the input question may in fact be formatted or structured as any suitable type of request, or simply as a set of input data to be processed, which may be parsed and analyzed using structured and/or unstructured input analysis, including but not limited to the natural language parsing and analysis mechanisms of a cognitive system such as IBM Watson™, to determine the basis upon which to perform cognitive analysis and providing a result of the cognitive analysis. Such processing may alternatively, or in addition, include image analysis, audio analysis, textual image analysis, biometrics analysis, or any other type of cognitive analysis that utilizes neural network, machine learning, or other AI or cognitive models which may be trained and hardened against gradient based attacks in accordance with the illustrative embodiments.

Regardless of the manner by which the question or request is input to the cognitive system 300, the processing of the request or question involves the application of an ensemble of trained AI models, e.g., neural network model, machine learning model, deep learning (cognitive) model, etc., to an input data set as described previously above. This input data set may represent features of the actual request or question itself, data submitted along with the request or question upon which processing is to be performed, or the like. The application of the ensemble of trained AI models to an input data set may occur at various points during the performance of the cognitive computing operations by the cognitive system. For example, the ensemble of trained AI models may be utilized during feature extraction and classification by a feature extraction stage of processing of the request or input question, e.g., taking a natural language term in the request or question and classifying it as one of a plurality of possible concepts that the term corresponds to, e.g., classifying the term "truck" in an input question or request into a plurality of possible classes, one of which may be "vehicle". As another example, a portion of an image comprising a plurality of pixel data may have the ensemble of trained AI models applied to it to determine what the object is that is in the portion of the image. The cognitive computing system 300 operates on the output of the ensemble of trained AI models as discussed previously above, which may be an intermediate operation within the overall cognitive system's cognitive computing operations, e.g., classification of a portion of a medical image into one of a plurality of different anatomical structures may be an intermediate operation to performing an anomaly identification and treatment recommendation cognitive computing operation.

As shown in FIG. 1, the cognitive system 400 is augmented, in accordance with the mechanisms of the illustrative embodiments, to include logic implemented in specialized hardware, software executed on hardware, or any combination of specialized hardware and software executed on hardware, for implementing a hardened ensemble AI model generator 420. The hardened ensemble AI model engine 420 may be provided as an external engine to the logic implementing the hardened ensemble of trained AI models 460. The hardened ensemble AI model engine 420 operates to generate the hardened ensemble of AI models 460 for use by or implementation in the request processing pipeline 408 to perform cognitive computing operations for the cognitive computing system 400. The generation of the hardened ensemble 460 is accomplished, as described above, by co-training AI models in a group of AI models, determining the similarity (or dissimilarity) of the gradients of the AI models during training, and injecting a regularizer into the gradients as necessary that maximizes a distance between the gradients while minimizing a loss in accuracy of the AI models. The trained AI models are then combined into an ensemble with additional logic for combining the outputs of the AI models to generate a single final output from the ensemble of AI models. The resulting hardened ensemble 460 is then deployed to the deployment environment for runtime utilization, such as in conjunction with or integrated in the request processing pipeline 408.

By performing the co-training of AI models using injected regularizers for ensuring that adversarial inputs are not transferrable between the AI models, the output of the ensemble of AI models is ensured to be based on at least one or more of the AI models providing an output that has not been influenced by the adversarial input to cause the output to be mistaken. Thus, correct classification and labeling of the input data set is still performed while protecting or hardening the ensemble of AI models, e.g., neural networks, against gradient based attacks, such as evasion attacks. The resulting classified or labeled data set may be provided to further downstream stages of the pipeline 408 for further processing and performance of the overall cognitive computing operation for which the cognitive system 400 is employed.

It should be appreciated that while FIG. 4 illustrates the implementation of the hardened ensemble 460 as part of a cognitive system 400, the illustrative embodiments are not limited to such. Rather, in some illustrative embodiments, the hardened ensemble 460 itself may be provided as a service from which a user of a client computing device 410, may request processing of an input data set. Moreover, other providers of services, which may include other cognitive systems, may utilize such a hardened ensemble 460 to augment the operation of their own cognitive systems. Thus, in some illustrative embodiments the hardened ensemble 460 may be implemented in one or more server computing devices, accessed via one or more APIs via other computing devices through which input data sets are submitted to the hardened ensemble 460, and corresponding labeled data sets are returned. Thus, the integration of the mechanisms of the illustrative embodiments into a cognitive system 400 is not required, but may be performed depending on the desired implementation.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 5 is provided as an example of one type of data processing system in which aspects of the present invention may be implemented. Many other types of data processing systems may be likewise configured to specifically implement the mechanisms of the illustrative embodiments.

FIG. 5 is a block diagram of an example data processing system in which aspects of the illustrative embodiments are implemented. Data processing system 500 is an example of a computer, such as server computing device 404 or client computing device 410 in FIG. 4, in which computer usable code or instructions implementing the processes for illustrative embodiments of the present invention are located. In one illustrative embodiment, FIG. 5 represents a server computing device, such as a server 404A, which implements a cognitive system 400 and request or QA system pipeline 408 augmented to include the additional mechanisms of the illustrative embodiments described herein with regard to a hardened model engine 420 for protecting the trained neural network, machine learning, deep learning, or other artificial intelligence model logic from gradient based attacks.

In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 is connected to NB/MCH 502 through an accelerated graphics port (AGP).

In the depicted example, local area network (LAN) adapter 512 connects to SB/ICH 504. Audio adapter 516, keyboard and mouse adapter 520, modem 522, read only memory (ROM) 524, hard disk drive (HDD) 526, CD-ROM drive 530, universal serial bus (USB) ports and other communication ports 532, and PCI/PCIe devices 534 connect to SB/ICH 504 through bus 538 and bus 540. PCI/PCIe devices may include, for example, Ethernet adapters, add-in cards, and PC cards for notebook computers. PCI uses a card bus controller, while PCIe does not. ROM 524 may be, for example, a flash basic input/output system (BIOS).

HDD 526 and CD-ROM drive 530 connect to SB/ICH 504 through bus 540. HDD 526 and CD-ROM drive 530 may use, for example, an integrated drive electronics (IDE) or serial advanced technology attachment (SATA) interface. Super I/O (SIO) device 536 is connected to SB/ICH 504.

An operating system runs on processing unit 506. The operating system coordinates and provides control of various components within the data processing system 500 in FIG. 5. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 500.

As a server, data processing system 500 may be, for example, an IBM® eServer™ System p° computer system, running the Advanced Interactive Executive (AIX®) operating system or the LINUX® operating system. Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and are loaded into main memory 508 for execution by processing unit 506. The processes for illustrative embodiments of the present invention are performed by processing unit 506 using computer usable program code, which is located in a memory such as, for example, main memory 508, ROM 524, or in one or more peripheral devices 526 and 530, for example.

A bus system, such as bus 538 or bus 540 as shown in FIG. 5, is comprised of one or more buses. Of course, the bus system may be implemented using any type of communication fabric or architecture that provides for a transfer of data between different components or devices attached to the fabric or architecture. A communication unit, such as modem 522 or network adapter 512 of FIG. 5, includes one or more devices used to transmit and receive data. A memory may be, for example, main memory 508, ROM 524, or a cache such as found in NB/MCH 502 in FIG. 5.

Those of ordinary skill in the art will appreciate that the hardware depicted in FIGS. 4 and 5 may vary depending on the implementation. Other internal hardware or peripheral devices, such as flash memory, equivalent non-volatile memory, or optical disk drives and the like, may be used in addition to or in place of the hardware depicted in FIGS. 4 and 5. Also, the processes of the illustrative embodiments may be applied to a multiprocessor data processing system, other than the SMP system mentioned previously, without departing from the spirit and scope of the present invention.

Moreover, the data processing system 500 may take the form of any of a number of different data processing systems including client computing devices, server computing devices, a tablet computer, laptop computer, telephone or other communication device, a personal digital assistant (PDA), or the like. In some illustrative examples, data processing system 500 may be a portable computing device that is configured with flash memory to provide non-volatile memory for storing operating system files and/or user-generated data, for example. Essentially, data processing system 500 may be any known or later developed data processing system without architectural limitation.

FIG. 6 illustrates an example of a cognitive system processing pipeline which, in the depicted example, is a question and answer (QA) system pipeline used to process an input question in accordance with one illustrative embodiment. As noted above, the cognitive systems with which the illustrative embodiments may be utilized are not limited to QA systems and thus, not limited to the use of a QA system pipeline. FIG. 6 is provided only as one example of the processing structure that may be implemented to process a natural language input requesting the operation of a cognitive system to present a response or result to the natural language input.

The QA system pipeline of FIG. 6 may be implemented, for example, as QA pipeline 408 of cognitive system 400 in FIG. 4. It should be appreciated that the stages of the QA pipeline shown in FIG. 6 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 6 is augmented, for example, in one or more of the stages to implement the improved mechanism of the illustrative embodiments described herein, additional stages may be provided to implement the improved mechanism, or separate logic from the pipeline 600 may be provided for interfacing with the pipeline 600 and implementing the improved functionality and operations of the illustrative embodiments.

As shown in FIG. 6, the QA pipeline 600 comprises a plurality of stages 610-680 through which the cognitive system operates to analyze an input question and generate a final response. In an initial question input stage 610, the QA pipeline 600 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 600, i.e. the question and topic analysis stage 620, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement.

For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

The classification of the extracted features from the input question may be performed using one or more trained models 625 which may be implemented, for example, as neural network models, machine learning models, deep learning models, or other type of artificial intelligence based model. As noted above, the mechanisms of the illustrative embodiments may be implemented at the question and topic analysis stage 620 with regard to the classification of the extracted features of the input question by a hardened ensemble of trained AI models 625. That is, the illustrative embodiments provide the hardened ensemble AI model generator 690 which trains the hardened ensemble of AI models 625 to harden the AI models within the ensemble 625 against gradient attacks by preventing transferability of adversarial inputs between the AI models of the ensemble 625. The hardened ensemble 625 operates in its normal capacity on the input data, e.g., operating on the extracted features from the input question to classify the extracted features, i.e. the input data, and thereby output labeled features to the question decomposition stage 630 for further analysis. Thus, the hardened ensemble 625 still provides correct classification downstream along the QA system pipeline 600, however, any attacker attempting to perform a gradient based attack against the hardened ensemble 625 will be unable to ascertain a correct gradient of the loss surface of the all of the trained AI models in the ensemble 625 such that they are able to generate an adversarial input that will cause each of the AI models in the ensemble to generate mistaken results.

It should be appreciated that the input data, in some illustrative embodiments, need not be a formulated request or question, either structure or unstructured, but instead may simply be an input data set that is input with the implied request that the input data set be processed by the pipeline 600. For example, in embodiments where the pipeline 600 is configured to perform image analysis cognitive operations, input images may be provided as input to the pipeline 600 which extracts major features of the input images, classifies them according to the hardened ensemble 625, and performs other processing of the pipeline 600 as described hereafter to score the hypotheses as to what is shown in the image, to thereby generate a final result output. In other cases, audio input data may also be analyzed in a similar manner. Regardless of the nature of the input data being processed, the mechanisms of the illustrative embodiments may be employed to train the AI models within the hardened ensemble 625 to be hardened against gradient based attacks and specifically transferability of adversarial inputs between the AI models within the ensemble 625.

Referring again to FIG. 6, and the question processing illustrative embodiment, the identified major features are then used during the question decomposition stage 630 to decompose the question into one or more queries that are applied to the corpora of data/information 645 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 645. That is, these various sources themselves, different collections of sources, and the like, represent a different corpus 647 within the corpora 645. There may be different corpora 647 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Still further, some corpora may be comprised of image data, audio data, or the like. Any collection of content having some similar attribute may be considered to be a corpus 647 within the corpora 645.

The queries are applied to one or more databases storing information about the electronic texts, documents, articles, websites, and the like, that make up the corpus of data/information, e.g., the corpus of data 406 in FIG. 4. The queries are applied to the corpus of data/information at the hypothesis generation stage 640 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 640, to generate hypotheses for answering the input question. These hypotheses are also referred to herein as "candidate answers" for the input question. For any input question, at this stage 640, there may be hundreds of hypotheses or candidate answers generated that may need to be evaluated.

The QA pipeline 600, in stage 650, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 660, the large number of scores generated by the various reasoning algorithms are synthesized into confidence scores or confidence measures for the various hypotheses. This process involves applying weights to the various scores, where the weights have been determined through training of the statistical model employed by the QA pipeline 600 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 600 that identifies a manner by which these scores may be combined to generate a confidence score or measure for the individual hypotheses or candidate answers. This confidence score or measure summarizes the level of confidence that the QA pipeline 600 has about the evidence that the candidate answer is inferred by the input question, i.e. that the candidate answer is the correct answer for the input question.

The resulting confidence scores or measures are processed by a final confidence merging and ranking stage 670 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 680, a final answer and confidence score, or final set of candidate answers and confidence scores, are generated and output to the submitter of the original input question via a graphical user interface or other mechanism for outputting information.

Figure 7:
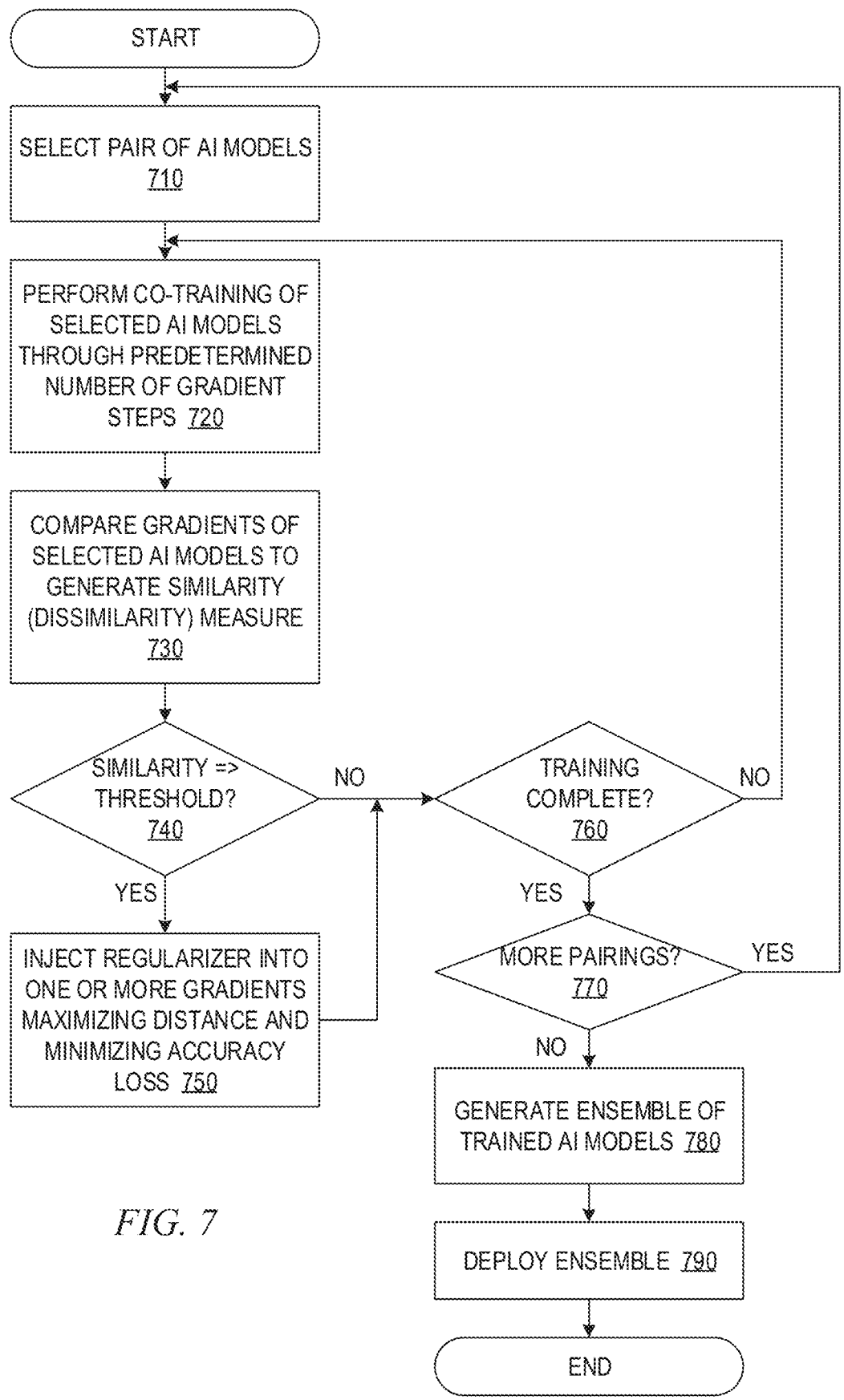
FIG. 7 is a flowchart outlining an example operation for training an ensemble of AI models, e.g., neural networks, in accordance with one illustrative embodiment.

FIG. 7 is a flowchart outlining an example operation for training an ensemble of AI models, e.g., neural networks, in accordance with one illustrative embodiment. As shown in FIG. 7, the operation starts by selecting a pair of AI models from a grouping of AI models for training (step 710). The pair of AI models are co-trained through a predetermined number of gradient steps in order to generate gradients for the AI models (step 720). The gradients of the AI models are compared to generate a similarity (or dissimilarity) measure (step 730). The similarity (or dissimilarity) measure is compared to a threshold to determine if the measure indicates the gradients have a similarity equal to or greater than a threshold similarity (step 740). In response to the gradients having a similarity equal to or greater than a threshold similarity, a regularizer is injected into one or more of the gradients so as to maximize a distance between the gradients while minimizing a loss in accuracy of the AI models (step 750).

A determination is made as to whether the training of the AI models is complete (step 760). If not, the operation returns to step 720. If the training of the AI models is complete, the operation continues to step 770 where a determination is made as to whether there are other pairings of AI models to be trained (step 770). If so, the operation returns to step 710. If not, the operation continues to step 780 where an ensemble of the trained AI models is generated at least by adding logic to combine the outputs of a set of the trained AI models (step 780). The ensemble is then deployed to a deployment environment for runtime use (step 790). The operation then terminates.

It should be appreciated that the above description is for illustrative purposes only and many modifications to the embodiments described above may be made without departing from the spirit and scope of the present invention. For example, there are various mechanisms that may be utilized to prevent the correct computation of gradients in the illustrative embodiments. For example, more or less layers may be utilized in the neural network to thereby provide simpler or more complex implementations. For example, embodiments may include additional layers, instead of two sets of outputs, may be provided with merging of the outputs in a later layer. In some embodiments, a single set of outputs nodes may be provided but trained with noisy samples and multiple layers making onion like shape loss surface with multiple ups and downs so that the gradients point to local optima. Also, some embodiments can build noisy samples with or without a confusion matrix, and instead use random labels, or those labels with large difference in the input space (e.g., give the label of images that are the most different from the class). Various other types of modifications may be utilized without departing from the spirit and scope of the present invention.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions which are executed by the processor to specifically configure the processor to implement a hardened ensemble artificial intelligence (AI) model generator, the method comprising:
   co-training, by the hardened ensemble AI model generator, at least two AI models, of an ensemble AI model computing system, on a same domain of training data;
   determining, during co-training of the at least two AI models, a similarity measure between a first gradient of a first AI model in the at least two AI models, and a second gradient of a second AI model in the at least two AI models;
   in response to the similarity measure between the first gradient and the second gradient being equal to or greater than a predetermined threshold similarity measure, determining that a loss surface of one of the first AI model or the second AI model is to be modified;
   in response to determining that the similarity measure is equal to or greater than the predetermined threshold, modifying, by the hardened ensemble AI model generator a loss surface of one of the first AI model or the second AI model, in the at least two AI models, to control a distance between the loss surfaces of the first AI model and the second AI model and prevent an adversarial attack on one AI model transferring to another AI model in the at least two AI models, and thereby generate a modified ensemble of AI models computing system; and
   processing, by the modified ensemble of AI models computing system, an input to generate an output result, wherein at least one of the AI models in the modified ensemble of AI models computing system generates a correct output for the output result when the input is an adversarial attack on the AI models.

2. The method of claim 1, wherein the similarity measure between the gradients of the loss surfaces is determined based on at least one of a cosine similarity or a Lp norm similarity.

3. The method of claim 1, wherein modifying the loss surface of one of the first AI model or the second AI model comprises adding a first regularizer term, having a first regularizer strength value, to a loss function of one of the first AI model or the second AI model, or increasing a second regularizer strength value of a second regularizer term in the loss function of one of the first AI model or the second AI model, and thereby control the similarity of the first gradient and second gradient of the first AI model and the second AI model.

4. The method of claim 3, wherein the first regularizer strength value or second regularizer strength value is set to a value that maximizes a distance between the loss surfaces of the first AI model and second AI model while minimizing accuracy loss of the at least two AI models in outputs generated by the at least two AI models.

5. The method of claim 1, wherein the at least two AI models comprises more than two AI models, and wherein the modifying comprises performing multiple pairwise comparisons of pairs of AI models in the at least two AI models and modifying loss surfaces of one or more of the AI models in each pair based on results of the comparisons, wherein the first AI model and the second AI model is one of the pairs of AI models.

6. The method of claim 5, wherein the pairwise comparisons of pairs of AI models are performed based on at least one of a clique architecture, a star architecture, or a ring architecture.

7. The method of claim 1, further comprising:
   wherein processing the input to generate the output result comprises processing the input by each of the AI models in the modified ensemble of AI models and combining the outputs of the AI models in the modified ensemble of AI models to generate a single output result for the modified ensemble.

8. The method of claim 7, wherein combining the outputs of the AI models in the modified ensemble of AI models to generate a single output result for the modified ensemble comprises at least one of averaging the outputs of the AI models in the modified ensemble of AI models or performing a majority vote operation on the outputs of the AI models in the modified ensemble of AI models.

9. The method of claim 1, wherein the co-training and modifying operations are performed for each mini-batch of training data used to train the at least two AI models.

10. A computer program product comprising a computer readable storage medium having a computer readable program stored therein, wherein the computer readable program, when executed on a data processing system, causes the data processing system to implement a hardened ensemble artificial intelligence (AI) model generator that operates to:
 co-train at least two AI models, of an ensemble AI model computing system, on a same domain of training data;
 determine, during co-training of the at least two AI models, a similarity measure between a first gradient of a first AI model in the at least two AI models, and a second gradient of a second AI model in the at least two AI models;
 determine, in response to the similarity measure between the first gradient and the second gradient being equal to or greater than a predetermined threshold similarity measure, that a loss surface of one of the first AI model or the second AI model is to be modified;
 modify, in response to determining that the similarity measure is equal to or greater than the predetermined threshold, a loss surface of one of the first AI model or the second AI model, in the at least two AI models, to control a distance between the loss surfaces of the first AI model and the second AI model and prevent an adversarial attack on one AI model transferring to another AI model in the at least two AI models, and thereby generate a modified ensemble of AI models computing system; and
 process, by the modified ensemble of AI models computing system, an input to generate an output result, wherein at least one of the AI models in the modified ensemble of AI models computing system generates a correct output for the output result when the input is an adversarial attack on the AI models.

11. The computer program product of claim 10, wherein the similarity measure between the gradients of the loss surfaces is determined based on at least one of a cosine similarity or a Lp norm similarity.

12. The computer program product of claim 10, wherein the computer readable program further causes the hardened ensemble AI model generator to the loss surface of one of the first AI model or the second AI model comprises adding a first regularizer term, having a first regularizer strength value, to a loss function of one of the first AI model or the second AI model, or increasing a second regularizer strength value of a second regularizer term in the loss function of one of the first AI model or the second AI model, and thereby control the similarity of the first gradient and second gradient of the first AI model and the second AI model.

13. The computer program product of claim 12, wherein the first regularizer strength value or second regularizer strength value is set to a value that maximizes a distance between the loss surfaces of the first AI model and second AI model while minimizing accuracy loss of the at least two AI models in outputs generated by the at least two AI models.

14. The computer program product of claim 10, wherein the at least two AI models comprises more than two AI models, and wherein the modifying comprises performing multiple pairwise comparisons of pairs of AI models in the at least two AI models and modifying loss surfaces of one or more of the AI models in each pair based on results of the comparisons, wherein the first AI model and the second AI model is one of the pairs of AI models.

15. The computer program product of claim 14, wherein the pairwise comparisons of pairs of AI models are performed based on at least one of a clique architecture, a star architecture, or a ring architecture.

16. The computer program product of claim 10, wherein the computer readable program further causes the hardened ensemble AI model generator to:
 wherein processing the input to generate the output result comprises processing the input by each of the AI models in the modified ensemble of AI models and combining the outputs of the AI models in the modified ensemble of AI models to generate a single output result for the modified ensemble.

17. The computer program product of claim 16, wherein combining the outputs of the AI models in the modified ensemble of AI models to generate a single output result for the modified ensemble comprises at least one of averaging the outputs of the AI models in the modified ensemble of AI models or performing a majority vote operation on the outputs of the AI models in the modified ensemble of AI models.

18. An apparatus comprising:
 at least one processor; and
 at least one memory coupled to the at least one processor, wherein the at least one memory comprises instructions which, when executed by the at least one processor, cause the at least one processor to implement a hardened ensemble artificial intelligence (AI) model generator that operates to:
 co-train at least two AI models, of an ensemble AI model computing system, on a same domain of training data;
 determine, during co-training of the at least two AI models, a similarity measure between a first gradient of a first AI model in the at least two AI models, and a second gradient of a second AI model in the at least two AI models;
 determine, in response to the similarity measure between the first gradient and the second gradient being equal to or greater than a predetermined threshold similarity measure, that a loss surface of one of the first AI model or the second AI model is to be modified;
 modify, in response to determining that the similarity measure is equal to or greater than the predetermined threshold, a loss surface of one of the first AI model or the second AI model, in the at least two AI models, to control a distance between the loss surfaces of the first AI model and the second AI model and prevent an adversarial attack on one AI model transferring to another AI model in the at least two AI models, and thereby generate a modified ensemble of AI models computing system; and
 process, by the modified ensemble of AI models computing system, an input to generate an output result, wherein at least one of the AI models in the modified ensemble of AI models computing system generates a correct output for the output result when the input is an adversarial attack on the AI models.

19. The method of claim 3, wherein the first regularizer term or second regularizer term comprises $\lambda \cos(\nabla L$ (x,y;

M_1), ∇L(x,y; M_2)) where λ is a regularization parameter having a value corresponding to the first regularizer strength value or the second regularizer strength value, ∇L (x,y; M_1) is the first gradient of the first AI model M_1, ∇L(x,y; M_2) is the second gradient of the second AI model M_2, and cos(∇L (x,y; M_1), ∇L(x,y; M_2)) is a cosine distance between the first gradient and the second gradient.

20. The computer program product of claim 12, wherein the first regularizer term or second regularizer term comprises λ cos(∇L (x,y; M_1), ∇L(x,y; M_2)) where λ is a regularization parameter having a value corresponding to the first regularizer strength value or the second regularizer strength value, ∇L (x,y; M_1) is the first gradient of the first AI model M_1, ∇L(x,y; M_2) is the second gradient of the second AI model M_2, and cos(∇L (x,y; M_1), ∇L(x,y; M_2)) is a cosine distance between the first gradient and the second gradient.

\* \* \* \* \*